United States Patent [19]
Aoki et al.

[11] Patent Number: 5,280,729
[45] Date of Patent: Jan. 25, 1994

[54] MAGNETOSTRICTIVE TORQUE DETECTING APPARATUS

[75] Inventors: Hiroyuki Aoki; Munekatsu Shimada; Itaru Shibata; Mikiya Shinohara, all of Yokohama; Masashi Mizuno, Aichi; Shinichiro Yahagi, Oobu; Masaru Nagata, Nagoya; Nobuyuki Matsui, Chita; Shigeo Hanashima, Tokai, all of Japan

[73] Assignees: Nissan Motor Co., Ltd., Yokohama; Daido Steel Co., Ltd., Nagoya, both of Japan

[21] Appl. No.: 868,116

[22] Filed: Apr. 14, 1992

[30] Foreign Application Priority Data

Apr. 30, 1991 [JP] Japan ................. 3-99000
Apr. 30, 1991 [JP] Japan ................. 3-99020
Feb. 3, 1992 [JP] Japan ................. 4-17852
Feb. 3, 1992 [JP] Japan ................. 4-17859
Feb. 3, 1992 [JP] Japan ................. 4-17869
Feb. 14, 1992 [JP] Japan ................. 4-28339

[51] Int. Cl.⁵ ............................. G01L 1/00
[52] U.S. Cl. ................. 73/862.333; 73/862.335
[58] Field of Search ............ 73/862.333, 862.334, 73/862.335, 862.336

[56] References Cited

U.S. PATENT DOCUMENTS

| | | | |
|---|---|---|---|
| 4,414,855 | 11/1983 | Iwasaki | 73/862.336 |
| 4,823,620 | 4/1989 | Edo et al. | 73/862.334 |
| 4,833,926 | 5/1989 | Todoroki et al. | 73/862.04 |
| 4,840,073 | 6/1989 | Aoki et al. | 73/862.334 |
| 4,964,308 | 10/1990 | Edo et al. | 73/862.335 |

FOREIGN PATENT DOCUMENTS

62-185136 8/1987 Japan.
2-107910 4/1990 Japan.

*Primary Examiner*—Richard E. Chilcot, Jr.
*Assistant Examiner*—R. Biegel
*Attorney, Agent, or Firm*—Foley & Lardner

[57] ABSTRACT

To obtain stable linear torque-output characteristics over a wide torque range in a magnetostrictive torque detecting apparatus having a shaft to be measured, an exciting coil for magnetically exciting the shaft, and a detecting coil for detecting magnetostrictive components generated in the shaft distorted by a torque, the shaft is particularly composed of a substrate shaft portion made of a high yield point material and a shape anisotropic layer portion made of a high magnetostrictive material metallographically welded on an outer surface of the substrate shaft. The welded shape anisotropic layer portion is formed with two symmetrical groups of concave/convex portions each arranged at regular angular intervals on the outer circumferential surface thereof at an inclination angle with respect to the axial direction of the shaft.

3 Claims, 28 Drawing Sheets

FIG. 8(b)—A
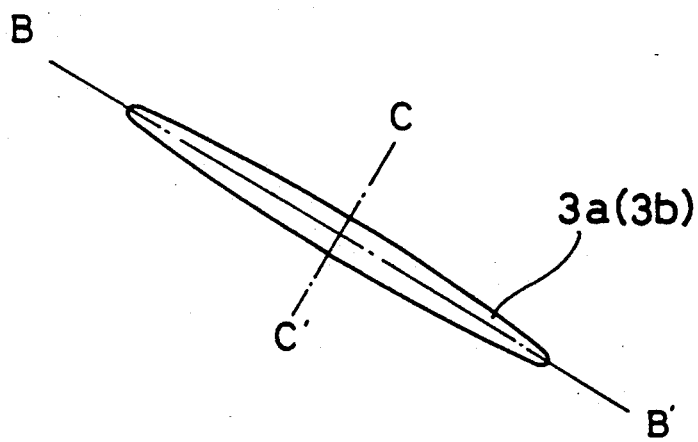
FIG. 8(b)—B
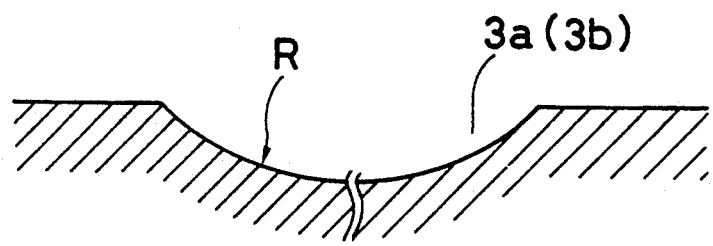
FIG. 8(b)—C
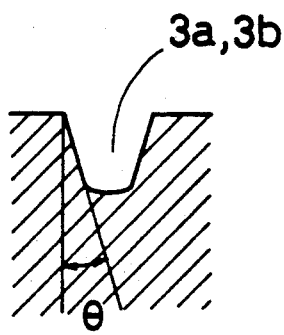

FIG. 9(a)-A
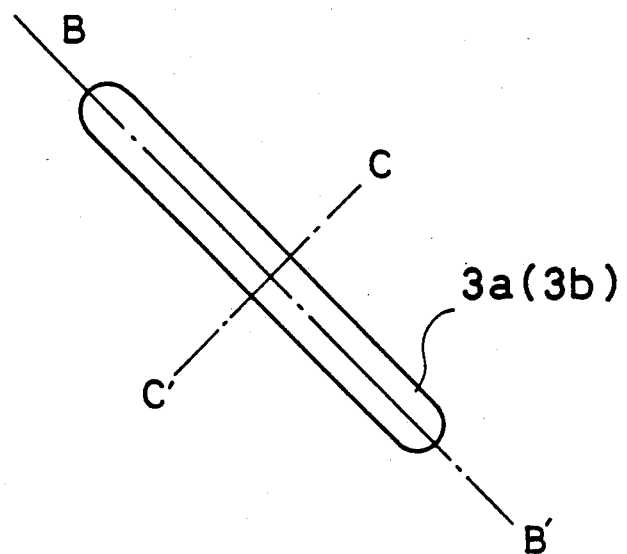
FIG. 9(a)-B
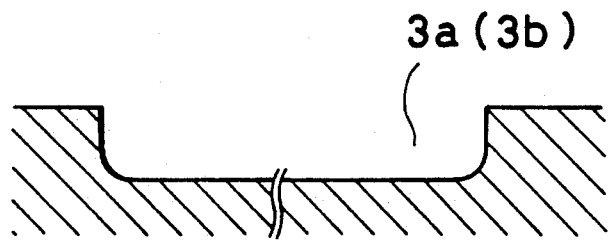
FIG. 9(a)-C
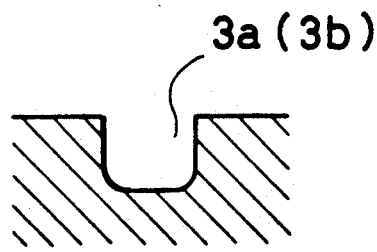

MAGNETOSTRICTIVE TORQUE DETECTING APPARATUS

RELATED APPLICATION

The present invention is relevant to our prior U.S. Pat. No. 4,833,926, entitled MAGNETOSTRICTIVE STRESS MEASUREMENT APPARATUS.

BACKGROUND OF THE INVENTION

1. Field of the Invention

The present invention relates to a magnetostrictive torque detecting apparatus, for detecting torque applied to a shaft made of a magnetostrictive material.

2. Description of the Prior Art

The magnetostrictive torque detecting apparatus as disclosed in the above-mentioned U.S. Patent document and Japanese Published Unexamined (Kokai) Pat. Appli. No. 62-185136, comprises a shaft made of a magnetostrictive material, a pair of magnetizing coil and detecting coils loosely arranged around the shaft, and a yoke for housing the two coils so as to form a magnetic circuit in cooperation with the shaft.

The shaft is formed with two symmetrically arranged groups of V-shaped concave/convex portions (e.g. grooves), the concave/convex portions of each group being arranged at regular angular intervals on the outer circumferential surface of the shaft at an inclination angle with respect to the axial direction of the shaft so as to form two shape anisotropic portions (at which the magnetic anisotropy is determined on the basis of the shape of the shaft made of magnetostrictive material). The two coils and other two fixed resistors are connected so as to form a bridge circuit. An exciting oscillator is connected to two junction points of the bridge circuit and a differential amplifier is connected to the remaining two junction points of the bridge circuit. Therefore, when a torque is applied to the shaft, under the condition that current is passed through each of these magnetizing and detecting coils, since each inductance of the two coils changes on the basis of magnetostrictive effect at the shape anisotropic portions (e.g. grooves), it is possible to detect the magnitude of a torque applied to the shaft on the basis of change in the inductance of the detecting coil.

The above-mentioned magnetostrictive torque detecting apparatus can be mounted on an industrial robot for effecting automated grinding work, for instance. In more detail, a plurality of shape anisotropic portions are formed on the outer circumferential surface of a motor shaft provided with a grinding stone at a free end thereof, and a detection signal indicative of torque is applied to a robot controller to control the motor speed, for instance, so that the pressure of the grinding stone against a workpiece to be ground can be appropriately determined.

In the above-mentioned torque detecting apparatus, since the shaft to be measured is usually made of a relatively high magnetostrictive material, it is possible to detect magnetostrictive components of the shaft at the shape anisotropic portion at high sensitivity and in noncontact fashion. In addition, it is possible to obtain stable detection output signals from a static torque to relatively high-speed revolution torque without fluctuations in output level when the shaft is being rotated.

In the prior-art magnetostrictive torque detecting apparatus, however, since the shaft to be measured is usually made of only an Fe-Al alloy (magnetostrictive material), there exists a problem in that it is impossible to obtain stable linear torque-output characteristics over a wide torque range. That is, although excellent linear characteristics can be obtained in a low-torque range, the detection output is inevitably saturated in a high-torque range. This is because the yield point of the shaft made of magnetostrictive material is low and therefore the shaft is plastically deformed microscopically.

Further, when the shape anisotropic portions are formed by cutting, there exists a problem in that stress concentration easily occurs at the shape anisotropic portions when a high torque is applied to the shaft, thus deteriorating the linear torque-output characteristics of the detecting apparatus.

Further, when the concave/convex shape anisotropic portions are simply formed in rectangular cross section shape, there exists a problem in that cracks are easily produced at the shape anisotropic portions when the shaft is heat treated, thus reducing the productivity of the shaft.

Further, when the two symmetrically arranged V-shaped groups of concave/convex portions are formed on the same alloy layer, there exists a problem in that the symmetrical groups of concave/convex portions are subjected to the mutual inductive relationship and therefore the points at which the maximum inductance can be obtained are offset from the central positions of the two symmetrical groups of concave/convex portions, thus preventing the output drift voltage at zero-torque point due to axial displacement of the shaft relative to the coils from being minimized.

SUMMARY OF THE INVENTION

With these problems in mind, therefore, it is the primary object of the present invention to provide a magnetostrictive torque detecting apparatus having stable linear torque-output characteristics over a wide range from low torque and high torque.

To achieve the above-mentioned object, the present invention provides a magnetostrictive torque detecting apparatus comprising: (a) a shaft composed of a substrate shaft portion made of a high yield point material and a torque detecting layer, known hereafter as a shape anisotropic layer portion, the portion being made of a high magnetostrictive material metallographically welded on an outer surface of the substrate shaft portion; (b) coil means for magnetically exciting the shape anisotropic layer portion of said shaft; and (c) coil means for detecting magnetostrictive components generated in the shape anisotropic layer portion of said shaft distorted by a torque. The shape anisotropic layer portion is an alloy layer with a thickness of 0.1 to 3.0 mm.

In the magnetostrictive torque detecting apparatus according to the present invention, since the shaft to be measured is formed with a substrate shaft portion made of a high yield point material and a shape anisotropic layer portion made of a high magnetostrictive material, the shape anisotropic portion can be supported by the strong shaft portion without being subjected to microscopic plastic deformation within a wide range from a low to a high torque, thus providing a wide range linear torque-output characteristics without saturation for many hours.

It is a second object of the present invention to provide a magnetostrictive torque detecting apparatus in which stress concentration will not occur at the shape anisotropic portion when a high torque is applied to the shaft.

To achieve the above-mentioned second object, the present invention provides a magnetostrictive torque detecting apparatus in which the shape anisotropic layer portion is an alloy layer formed with two symmetrically arranged groups of concave/convex portions, the concave-convex portions of each group being deformed plastically at regular angular intervals on the outer circumferential surface of the alloy layer portion at an inclination angle with respect to axial direction of said shaft by surface heating said shaft at a predetermined temperature where the Charpy impact value of the alloy layer is relatively high. The concave/convex portions of the alloy layer is plastically deformed by a rolling machine and surface heated by high frequency induction heat. The predetermined temperature is from 400° to 900° C. when the shape anisotropic layer portion is of Fe-Al alloy.

In the magnetostrictive torque detecting apparatus of the second embodiment, since the shape anisotropic portions is an Fe-Al based alloy layer and the concave/convex portions are formed by plastic working at temperature of more than 400° C., it is possible to form the concave/convex portions plastically without producing any stress concentration, thus providing still a wide range linear torque-output characteristics, while improving shaft productivity.

It is a third object of the present invention to provide a magnetostrictive torque detecting apparatus in which the substrate shaft can be sufficiently hardened to increase the yield point of the substrate material.

To achieve the above-mentioned third object, the present invention provides a magnetostrictive torque detecting apparatus in which the shape anisotropic layer portion is an alloy layer formed with two symmetrical groups of concave/convex portions each arranged at regular angular intervals on the outer circumferential surface of the alloy layer portion at an inclination angel with respect to axial direction of said shaft in such a way that at least the bottoms of the concave portions are exposed for hardening of the substrate shaft portion. The surface hardness of the exposed bottom of the concave portion is Hv 600 or more after hardening treatment, and with an effective hardened layer depth thereof more than Hv 550 is 0.2 mm or more. The hardening treatment is selected from the group of processes consisting of carburizing, nitriding, carbonitriding, shot-ball penning, cold rolling and cold hammering according to the material of the high yield point substrate shaft.

In the magnetostrictive detecting apparatus of the third embodiment, since the bottoms of the concave portions of the shape anisotropic portions are exposed and, therefore, surface-hardened by a chemical hardening treatment and/or mechanical hardening processing up to Hv 600 or more to a depth of 0.2 mm (of more than Hv 550), it is possible to securely increase the strength of the substrate shaft, thus providing still a wider linear torque-output characteristic range without saturation for many hours.

It is a fourth object of the present invention to provide a magnetostrictive torque detecting apparatus by which cracks can be prevented from being produced at the concave/convex portions when the shaft is heat treated.

To achieve the above-mentioned fourth object, the present invention provides a magnetostrictive torque detecting apparatus in which the shape anisotropic layer portion is an alloy layer formed with two symmetrical groups of concave/convex portions each arranged at regular angular intervals on the outer circumferential surface of the alloy layer portion at an inclination angle with respect to axial direction of said shaft in such a way that the side wall surfaces of the formed concave/convex portions decline at an inclination angle with respect to normal of the outer surface of the shape anisotropic portion of the shaft. The inclination angle is 10 degrees or more.

In the magnetostrictive torque detecting apparatus of the fourth embodiment, since the wall surfaces of the convex/concave portions of the shape anisotropic portions are inclined at an inclination angle of 10 degrees or more with respect to normal of the outer surface of the shaft, it is possible to effectively prevent cracks from being produced at the concave/convex portions when the shaft is heat treated, thus improving productivity of the shaft.

It is a fifth object of the present invention to provide a magnetostrictive torque detecting apparatus by which cracks can be prevented from being produced at the boundary portions between the shape anisotropic layer portion and the substrate shaft portion when the shape anisotropic portion is fused with the substrate shaft portion or when the shaft is heat treated.

To achieve the above-mentioned fifth embodiment, the present invention provides a magnetostrictive torque detecting apparatus in which the shape anisotropic layer portion of a high magnetostrictive material is metallographically welded on an outer surface of the substrate shaft portion of a high yield point material in such a way that fusing boundary surfaces between the shape anisotropic layer portion and the substrate shaft portion are declined at an inclination angle with respect to normal of the outer surface of said shaft. The inclination angle is 30 degrees or more.

In the magnetostrictive torque detecting apparatus of the fifth embodiment, since the boundary surfaces between the shape anisotropic layer portion and the substrate shaft portion are inclined at an inclination angle of 30 degrees or more with respect to normal of the outer surface of the shaft, it is possible to prevent cracks from being produced at the boundary portions between the two when the shape anisotropic portion is fused with the substrate shaft portion or when the shaft is heat treated, thus improving the productivity of the shaft.

It is a sixth object of the present invention to provide a magnetostrictive torque detecting apparatus which can minimize the output drift voltage at the zero-torque point due to axial displacement of the shaft relative to the two coils.

To achieve the above-mentioned sixth embodiment, the present invention provides a magnetostrictive torque detecting apparatus in which the shape anisotropic portion of a high magnetostrictive material is divided into two symmetrical portions with a low permeability portion interposed between the two divided portions; two symmetrically arranged groups of concave/convex portions are formed on the two divided portions, respectively; and said exciting and detecting coil means are located at the axially central positions of the two shape anisotropic portions of the two divided portions, respectively. The low permeability portion interposed between the two divided portions is an exposed surface portion of the substrate shaft portion.

In the magnetostrictive torque detecting apparatus of the sixth embodiment, since the shape anisotropic portion is divided into two symmetrical portions with a low permeability portion interposed between the two so as to form two symmetrically arranged grooves of concave/convex portions, and therefore the exciting and detecting coils can be located at the axially central positions of the two divided shape anisotropic portions, respectively, without being subjected to the mutual inductive relationship (an offset) between the two symmetrically arranged grooves of concave/convex portions, it is possible to minimize the output drift voltage at the zero-torque point due to axial displacement of the shaft relative to the two coils.

BRIEF DESCRIPTION OF THE DRAWINGS

FIG. 8(b)-A is an enlarged plan view showing one concave portion of the shaft shown in FIG. 8(a);

FIG. 8(b)-B is a cross-sectional view showing the same concave portion taken along the longitudinal axis thereof;

FIG. 8(b)-C is a cross-sectional view showing the same concave portion taken along the transversal axis thereof;

FIG. 8(c) is a graphical representation showing the torque-output characteristics of the shaft shown in FIG. 8(a);

FIG. 9(a)-A is an enlarged plan view showing one concave portion of the comparative shaft;

FIG. 9(a)-B is a cross-sectional view showing the same concave portion taken along the longitudinal axis thereof;

FIG. 9(a)-C is a cross-sectional view showing the same concave portion taken along the transversal axis thereof;

FIG. 9(b) is an enlarged plan view showing the comparative shaft, in which cracks are shown;

DETAILED DESCRIPTION OF THE PREFERRED EMBODIMENTS

Embodiments of the magnetostrictive torque detecting apparatus according to the present invention will be described hereinbelow with reference to the attached drawings. The basic embodiment thereof is described with reference to FIGS. 1(a) to 2(d).

Figure 1A:
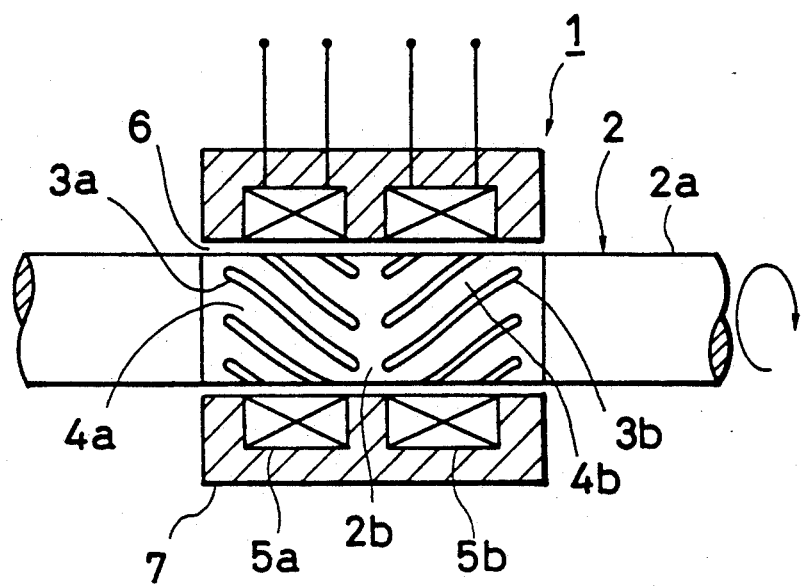
FIG. 1(a) is a fragmentary longitudinal cross-sectional view showing a basic embodiment of the magnetostrictive torque detecting apparatus according to the present invention.

With reference to FIG. 1(a), the detecting apparatus 1 comprises a shaft 2 to be measured, exciting and detecting coils 5a an 5b, and a yoke 7.

The shaft 2 is composed of a substrate shaft portion 2a made of a high yield point material and a metallic alloy (shape anisotropic) layer portion 2b made of a high magnetostrictive material welded metallographically on the outer circumferential surface of the substrate shaft portion 2a. Here, the shape anisotropic portion means an area where magnetic anisotropy is developed according to the shape of the magnetic material.

The alloy layer portion 2b is formed with two symmetrically arranged groups of V-shaped concave (i.e. groove) portions 3a and 3b. The concave portions 3a or 3b of each group are arranged at regular angular intervals on the outer circumferential surface of the alloy layer portion 2b at an inclination angle (e.g. 45 degrees) with respect to the shaft axial direction. The shape anisotropic portions 4a and 4b are formed between two of these parallel-arranged concave portions 3a and 3b, respectively.

The two coils 5a and 5b are arranged around the shaft so as to surround the two shape anisotropic portions 4a and 4b, respectively via a gap 6 between the shaft 2 and the coils 5a, 5b. Therefore, a magnetic circuit can be formed around the coil cross section by way of the yoke 7, the air gap 6, the shape anisotropic portions 4a and 4b of the shaft 2, the air gap 6 again, and the yoke 7.

Figure 1B:
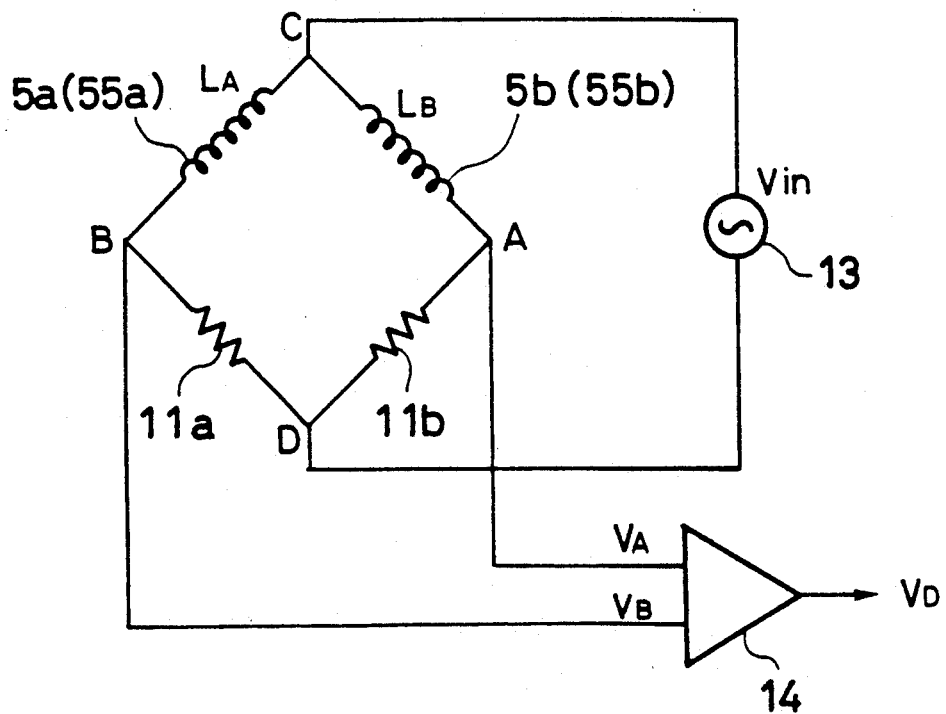
FIG. 1(b) is a circuit diagram showing an exciting and detecting circuit for detecting changes in the magnetostrictive components of the shaft of the torque detecting apparatus shown in FIG. 1(a)

The two coils 5a 5b are connected with two resistors 11a and 11b so as to construct a bridge circuit as shown in FIG. 1(b). An exciting oscillator 13 is connected to two junction points C and D of the bridge circuit, and a differential amplifier 14 is connected to two junction points A and B of the bridge circuit to obtain a detection output signal ($V_D$) indicative of a torque applied to the shaft 2.

Therefore, these two coils 5a and 5b are used in common as means for exciting the magnetic circuit and means for detecting the magnetostrictive components of the shaft 2 to be measured.

In the torque detecting apparatus of the present invention, when a torque is applied to the shaft, since the magnetic characteristic of the magnetostrictive material changes according to the torsional stress generated in the shape anisotropic portions 4a and 4b due to the torque, it is possible to detect change in torque as change in inductance $L_A$ or $L_B$, that is, change in output voltage.

The basic concept of the present invention results from the inventor's considerations as follows: the saturation of the torque-output characteristics of the prior-art torque detecting apparatuses may be due to the microscopic plastic deformation of the magnetostrictive shaft to be measured, that is, due to the irreversible magnetic state of the shaft. In practice, since the magnetostrictive material is low in the proportional limit of torsional stress, it is preferable to receive a high torque by a substrate shaft of a high yield point, without applying a large torque to the magnetostrictive material.

To realize the above-mentioned concept, in the detecting apparatus according to the present invention, the shaft 2 to be measured is composed of a substrate shaft portion 2a made of a high yield point material and an alloy (shape anisotropic) layer portion 2b made of a high magnetostrictive material in such a way that the high magnetostrictive material 2b is welded metallographically on the outer circumferential surface of the substrate shaft portion 2a; that is, both boundary surfaces are fused metallographically with respect to each other.

The high yield point material used for the shaft substrate 2a is a mechanical structural steel material standardized by JIS (Japanese Industrial Standard) such as SCr, SCM, SNC, SNCM materials, etc. However, it is also possible to use any other materials in which the additive components or composition is modified to further improve the yield point.

The magnetostrictive material used for the alloy layer 2b is a magnetostrictive metal such as Fe, Ni, etc. or a magnetostrictive alloy such as Fe-Ni, Fe-Al, Fe-Co, etc. However, it is also possible to use any other materials in which the additive components or composition is modified in order to further improve the magnetostrictive effect.

The thickness of the alloy layer 2b ranges from 0.1 to 3.0 mm, and preferably from 0.8 to 1.0 mm, which is relatively thicker than the prior-art layer mechanically covered with magnetostrictive material by Ni plating (about 10 $\mu$m thick), amorphous (about 20 to 40 $\mu$m thick), sputtering (about 1 $\mu$m thick), plasma arc coating (about 0.1 mm thick), etc.

To metallographically fuse the magnetostrictive material with the high yield point material, TIG (Tungsten-Inert Gas) welding, plasma powder welding, laser welding, electron beam welding or diffusion can be adopted.

Since the magnetostrictive alloy layer 2b is welded metallographically on the substrate shaft 2a, being different from the prior-art mechanical adhesion of the alloy layer to the substrate shaft, the magnetostrictive alloy layer will not peel off from the substrate shaft, even when a high torque is repeatedly applied to the shaft.

EXAMPLE 1

Figure 2A:
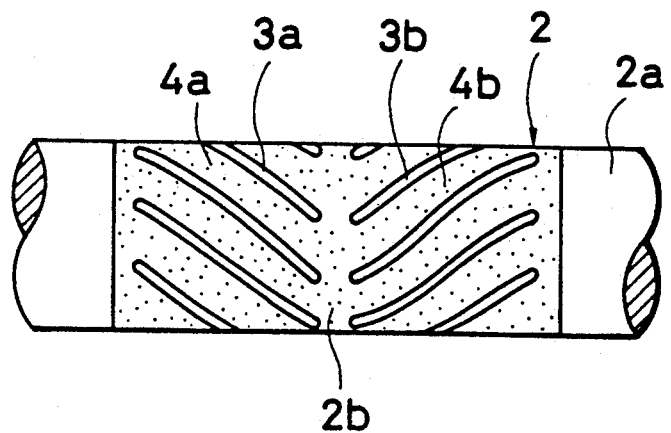
FIG. 2(a) is an enlarged plan view showing shape anisotropic portions formed on the circumferential surface of the shaft shown in FIG. 1(a)
Figure 2B:
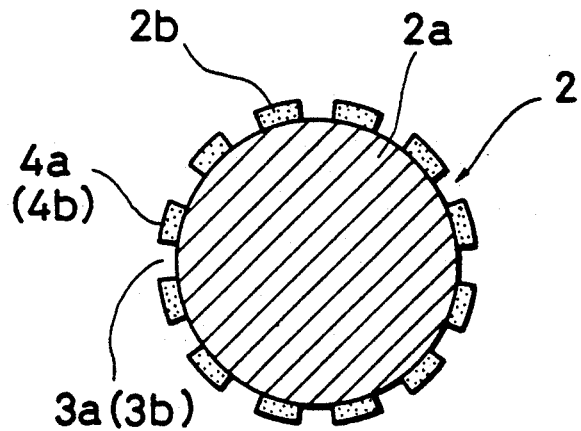
FIG. 2(b) is an enlarged cross-sectional view showing the same shape anisotropic portions.

FIGS. 2(a) and 2(b) are enlarged views showing the shape anisotropic portions 4a and 4b formed on the outer circumferential surface of the shaft 2. The substrate shaft 2a of the shaft 2 was made of material having a high yield point (e.g. carbon steel corresponding to JIS S25C) with a diameter of 18.5 mm. The alloy layer 2b was made of material having a high magnetostrictive effect of Fe-Ni alloy (including 45 wt. % Ni and 55 wt. % Fe). The alloy layer 2b was metallographically fused with the substrate shaft 2a by TIG welding, for instance. After the alloy layer 2b had been welded on the substrate shaft 2a, the diameter of the shaft 2 was cut down to 20 mm.

Further, two symmetrically arranged groups of 12 V-shaped spiral concave portions 3a and 3b with a width of 2 mm and a depth of 1 mm, respectively, were cut on the outer circumferential surface of the alloy layer 2b so as to be arranged at regular angular intervals with an inclination angle (45 degrees) with respect to the shaft axial direction. Therefore, a plurality of shape anisotropic portions 4a and 4b were formed between two of these concave portions 3a and 3b, respectively. The shaft 2, thus formed, was hardened (quenched) and subsequently tempered.

Figure 2C:
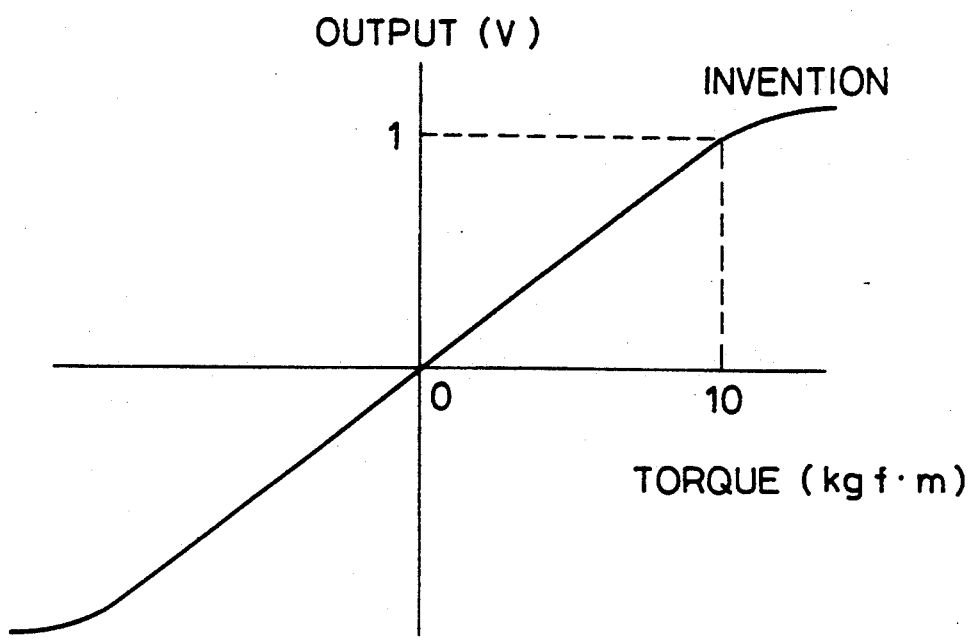
FIG. 2(c) is a graphical representation showing the torque-output characteristics of the torque detecting apparatus according to the present invention.

FIG. 2(c) shows a torque-output characteristic curve of the torque detecting apparatus 1 according to the present invention, which indicates that the output torque saturates when the torque applied to the shaft 2 exceeds 10 kgf.m.

COMPARATIVE EXAMPLE 1C

Figure 2D:
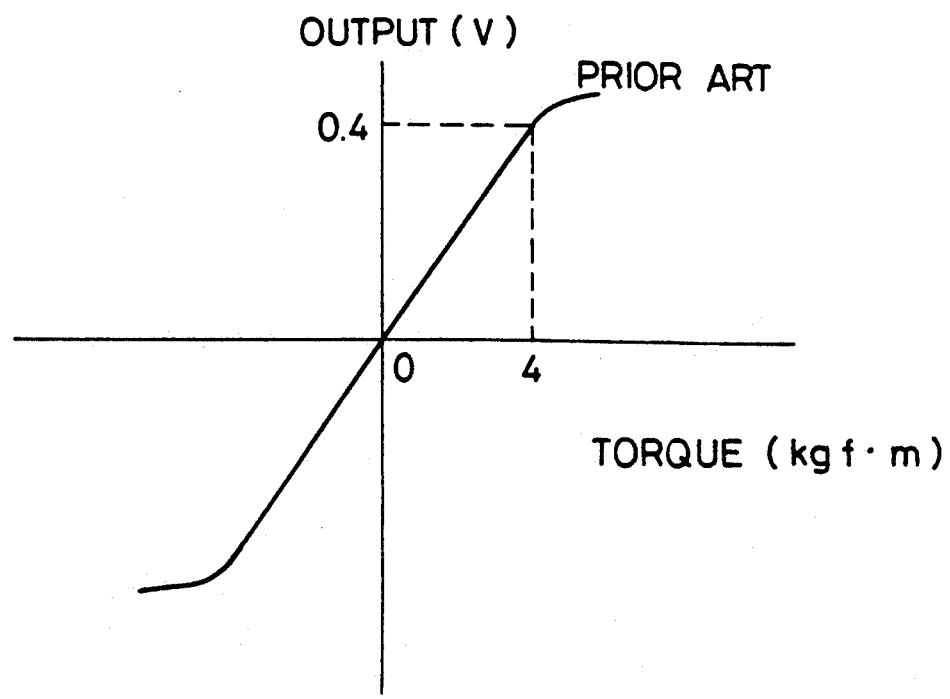
FIG. 2(d) is a graphical representation showing the same characteristics of the prior-art torque detecting apparatus.

For comparison, a prior-art torque detecting apparatus was prepared by forming a 20 mm dia. shaft made only the magnetostrictive material of Fe-Ni alloy, including 45 wt. % Ni and 55 wt. % Fe and formed with the same shape anisotropic portions. FIG. 2(d) shows the same characteristic curve of the prior-art torque detecting apparatus, which indicates that the output torque saturates when the torque applied to the shaft exceeds only 4 kgf.m.

FIGS. 2(c) and 2(d) indicate that the torque detecting apparatus according to the present invention can increase the torque detecting range about 2.5 times as wide as that of the prior art apparatus.

In addition, an excellent durability of more than 100 thousand times was verified as the result of fatigue tests without raising any problems such as peeling-off of the alloy layer, abnormal outputs, etc.

In the torque detecting apparatus according to the present invention, the alloy layer 2b of high magnetostrictive material is metallographically welded on the shaft substrate 2a of high yield point material. Therefore, when a torque is applied to the shaft 2 to be measured, since the shaft is distorted against the rigidity of the high yield point substrate, the magnetostrictive alloy layer 2b can be deformed elastically without being deformed plastically. Therefore, it is possible to obtain stable linear torque-output characteristics for a long time, over a wide range from a low torque to a high torque, without saturation of output signals while preventing the peeling-off of the magnetostrictive alloy layer from the substrate shaft.

The second embodiment of the torque detecting apparatus according to the present invention will be described hereinbelow with reference to FIGS. 3(a) to 3(f).

In the shaft 2 provided with the shape anisotropic portions according to the present invention, the concave portions 3a and 3b are formed by mechanically cutting the alloy layer 2b of high magnetostrictive material. In the shaft whose concave portions are formed having straight side wall surfaces vertical with respect to the alloy layer surface and sharp corners on top of the side walls, there exists a problem in that stress concentration readily occurs at the concave portions 3a and 3b, in particular, when a high torque is applied to the shaft 2, so that it is somewhat difficult to obtain the linear torque-output characteristics in the high torque range. In addition, when a hard magnetostrictive material such as Fe-Al based alloy is used as the alloy layer of the shaft 2, there exist other problems in that the cutting processability or workability is low; the cutter is easily damaged; and long machining time is required, thus resulting in difficulty of mass production of the shaft.

The second feature of the present invention is to provide a shaft formed with concave portions 3a and 3b free from stress concentration when a high torque is applied to the shaft and suitable for mass production, while providing stable wide-range torque-output characteristics.

To realize the above-mentioned feature, the concave portions 3a and 3b of the shaft 2 are formed by plastic working with a forming die at temperature of more than 400° C. so as to provide a smoothly curved contour. This is because the Charpy impact test value of Fe-Al alloy (magnetostrictive material) increases sharply at 400° C. or higher as depicted in FIG. 3(e), and, therefore, it is possible to improve the toughness of the high magnetostrictive material (e.g. Fe-Al alloy) markedly and additionally to increase the plastic workability of the high magnetostrictive material. Here, the Charpy impact test implies a method of measuring the ductility of metal by use of a freely-vibrating pendulum.

Further, when the shaft is heated by use of a high frequency induction heating apparatus, it is possible to heat only the superficial portion (Fe-Al alloy of magnetostrictive material) of the shaft without heating the substrate portion (S25C). Therefore, it is possible to more effectively deform only the Fe-Al alloy plastically without deforming the hard shaft substrate portion. In other words, it is possible to easily form smoothly curved shape anisotropic portions by plastic working (e.g. rolling) when the shaft is heated up to 400° C. or higher by high frequency induction heating method. However, since the life of the forming die for forming a smoothly curved contour around the magnetostrictive material by plastic working is markedly reduced when the forming die is heated to 900° C. or higher, it is preferable to form the shape anisotropic portions by plastic working at a temperature between 400° C. and 900° C.

Further, in the above-mentioned method, since the shape anisotropic portions can be formed plastically by use of a forming die in a short time (e.g. 3 min), it is possible to markedly increase the productivity of the shaft, being different from the cutting work.

EXAMPLE 2

Figure 3A:
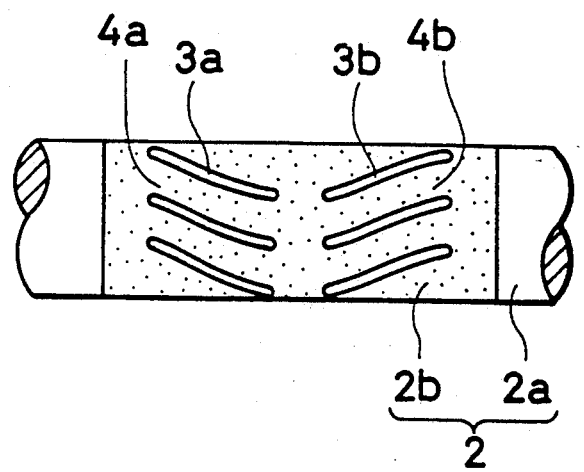
FIG. 3(a) is an enlarged plan view showing a second embodiment of the shaft according to the present invention.
Figure 3B:
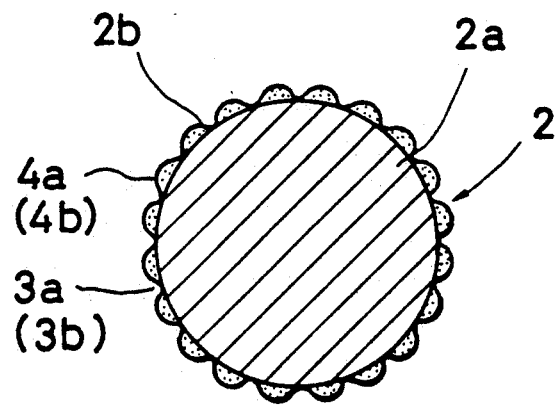
FIG. 3(b) is an enlarged cross-sectional view showing the shaft shown in FIG. 3(a)
Figure 3C:
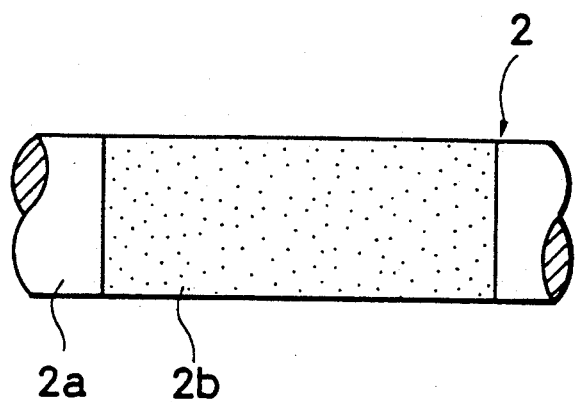
FIG. 3(c) is an enlarged plan view showing the shaft of FIG. 3(a) before plastic working.
Figure 3D:
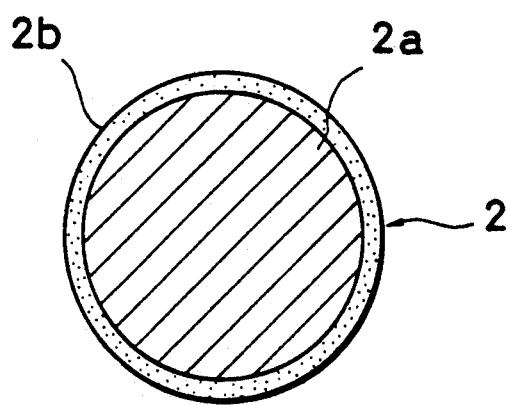
FIG. 3(d) is an enlarged cross-sectional view showing the shaft shown in FIG. 3(b) before plastic working.
Figure 3E:
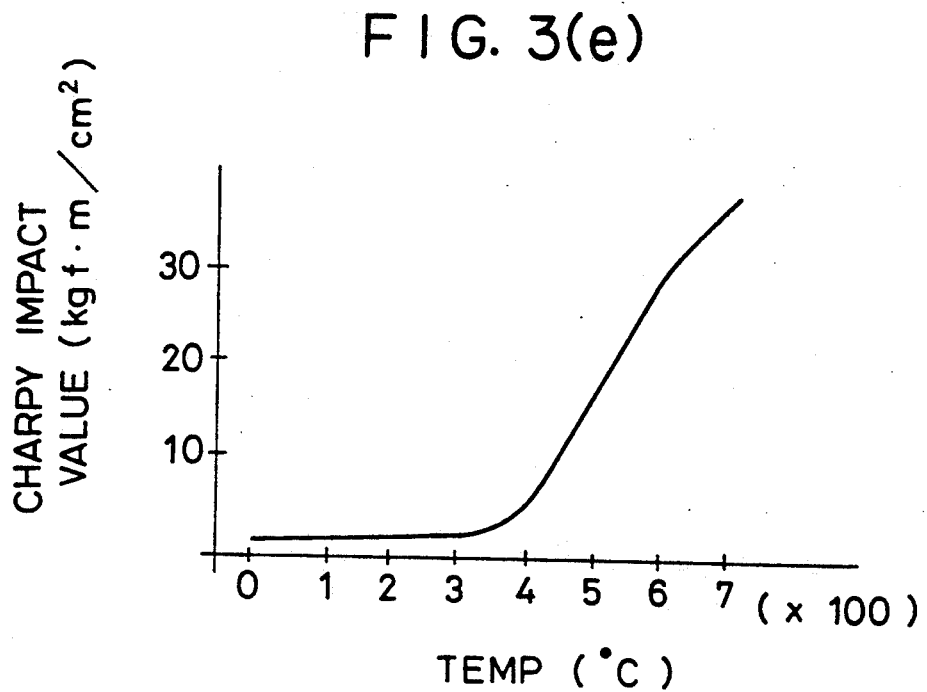
FIG. 3(e) is a graphical representation showing the relationship between the Charpy impact value and temperature of the Fe-Al alloy.

FIGS. 3(a) to 3(d) are enlarged views showing the shape anisotropic portions 4a and 4b formed on the outer circumferential surface of the shaft 2. The substrate shaft 2a was made of a carbon steel corresponding to JIS S25C, with a diameter of 18.5 mm. The high magnetostrictive alloy layer 2b was made of Fe-Al alloy (including 13 wt. % Al and 87 wt. % Fe), and welded on the surface of the substrate 2a metallographically by plasma powder welding. After the alloy layer 2b had been welded on the substrate 2a, the shaft 2 was cut to 20 mm in diameter as shown in FIGS. 3(c) and 3(d). Further, the shaft 2 was heated by high frequency induction heater so that the surface portion of the magnetostrictive material 2b was heated at 400° C. or higher and immediately processed plastically by a forming die of a rolling machine to form the smoothly curved shape anisotropic portions 4a and 4b between the concave portions 3a and 3b as shown in FIG. 3(b). The pitch of the formed convex portions was about 3 mm and the depth thereof was about 1 mm. FIG. 3(b) shows the substrate shaft 2a of S25C carbon-steel and the magnetostrictive layer 2b of Fe-Al alloy whose contour is formed into smoothly corrugated shape. The shaft whose curved shape anisotropic portions had been formed by plastic working was quenched and subsequently tempered.

Figure 3F:
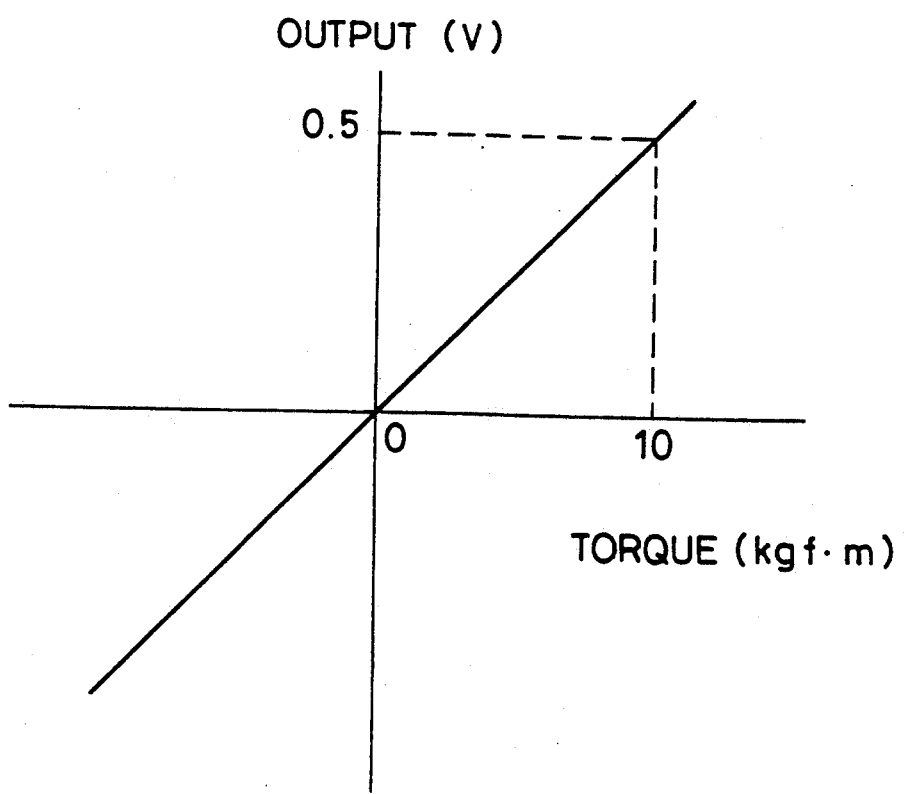
FIG. 3(f) is a graphical representation showing the torque-output characteristics of the shaft shown in FIG. 3(a)

FIG. 3(f) shows the torque-output characteristics of the apparatus including the shaft thus formed, which indicates a stable linear characteristic from a low torque to a high torque.

The third embodiment of the torque detecting apparatus according to the present invention will be described hereinbelow with reference to FIGS. 4(a) to 7.

In the above-mentioned shaft 2 composed of a high yield point substrate shaft 2a and a high magnetostrictive alloy layer 2b, where the substrate shaft 2a is treated for surface hardening (e.g. carburizing, nitriding etc.) after the high magnetostrictive alloy layer 2b has been welded on the substrate shaft 2a, there exists a problem in that the afore-mentioned linear torque-output characteristics are not necessarily obtained over a wide range.

In this connection, the substrate material can be surface hardened (carburized or nitrided) before the high magnetostrictive material is welded on the substrate material. In this case, however, there arises the other problems in that cracks are easily produced in the shaft during the welding process or the hardness of the surface-hardened layer of the shaft is annealed during the fusing process.

Therefore, the third feature of the present invention is to enable the high yield point substrate material which requires surface hardening (e.g. carburizing, nitriding, etc.) to be usable for the shaft according to the present invention.

To realize the above-mentioned feature, the shape anisotropic portions (concave portions) of the magnetostrictive material are formed in such a way that at least bottoms of the concave portions are exposed for subsequent surface hardening treatment.

In this embodiment, the shaft 2 is composed of a substrate shaft 2a made of a high yield point material hardened by surface hardening treatment and an alloy layer 2b made of a high magnetostrictive material metallographically fused with the substrate material. The substrate material is mechanical structural steel material standardized by JIS, such as SC, SCr, SCM or SNCM, suitable for carburizing; and SACM 645, SCM 56, SCMV 2, SAC, suitable for nitriding. However, it is also possible to use any other materials in which the additive components or composition is modified to further improve the yield point. The alloy layer material is a high magnetostrictive material, such as Fe, Ni, Fe-Ni alloy, Fe-Al alloy, Fe-Co alloy, etc. However, it is also possible to use any other materials in which the additive components or composition is modified to further improve the magnetostrictive effect.

To metallographically fuse the magnetostrictive material with the high yield point material, TIG welding, plasma powder welding, laser welding, electron beam welding or diffusion is adopted.

The gist of the third feature according to the present invention is to form the shaped anisotropic portions 4a and 4b in such a way that at least the bottoms of the concave portions 3a and 3b are exposed for subsequent treatment for hardening the surface of the substrate material. This is because when the outer circumferential surface of the substrate material is completely covered by the magnetostrictive material, it is impossible to effectively harden the substrate material by hardening treatment.

Where carburizing is effected to harden the surface of the substrate material, it is preferable to determine the depth of carburization to be in a range from 0.5 to 1.2 mm at the exposed bottoms of the concave portions 3a and 3b in order to improve the fatigue strength of the shaft 2.

When nitriding is effected to harden the surface of the substrate material, the shaft 2 is kept within a nitrizing atmosphere including 80 to 90% $NH_3$ at 500° to 550° C. for 15 to 30 hours, for instance.

The hardness at the exposed bottoms of the concave portions 3a and 3b ranges preferably from Hv 600 to Hv 800 (Vickers hardness) from the practical torque standpoint. If the hardness exceeds Hv 800, there exists a problem in that the shaft becomes brittle. Further, it is preferable that the effective depth of the hardened layer with a hardness of more than Hv 550 is 0.2 mm or more in order to increase the torque measurement range.

Further, it is also effective to harden the exposed surface of the high yield point substrate material by physical or mechanical processing, such as shot-ball peening, cold rolling, cold hammering (forging), etc., instead of carburizing or nitriding or carbonitriding.

In the shaft according to the present invention, an alloy layer of high magnetostrictive material is metallographically welded on a shaft substrate of high yield point material which requires surface hardening, and thereafter two symmetrically arranged groups of plural concave portions are formed at regular angular intervals on the outer circumferential surface of the alloy layer of the shaft at an inclination angle with respect to the axial direction of the shaft in such a way that at least the bottoms of the concave portions are exposed. Subsequently, the shaft is treated for surface hardening by permeating carbon or nitrogen into the substrate shaft to obtain a high yield point of the substrate material. Therefore, it is possible to provide a torque detecting apparatus having excellent torque-output characteristics and sufficient fatigue limit and life.

EXAMPLE 3A

Figure 4A:
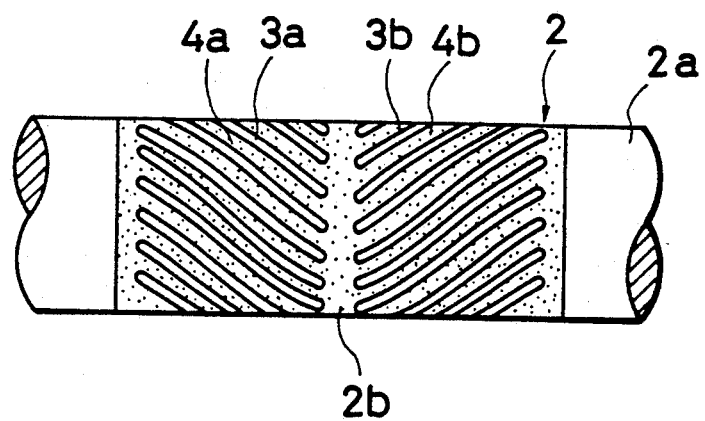
FIG. 4(a) is an enlarged plan view showing a third embodiment of the shaft according to the present invention.
Figure 4B:
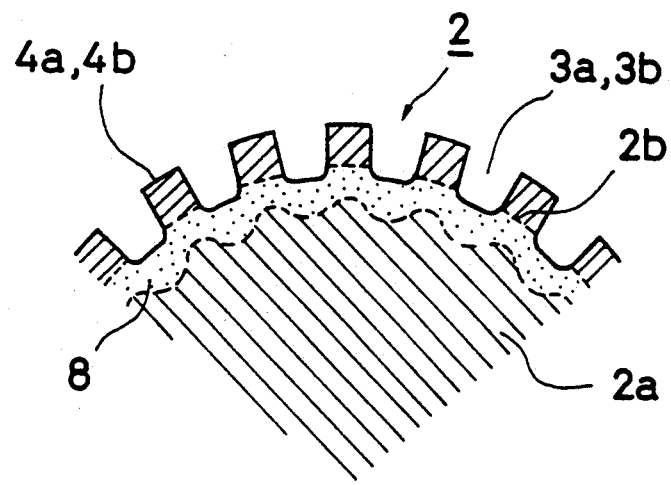
FIG. 4(b) is an enlarged cross-sectional view of the shaft in FIG. 4(a)

FIGS. 4(a) and 4(b) are enlarged views showing the shape anisotropic portions 4a and 4b formed on the outer circumferential surface of the shaft 2. The substrate shaft 2a of the shaft 2 was made of an alloy steel corresponding to JIS SCM 420 with a diameter of 29 mm. The high magnetostrictive alloy layer 2b was made of Fe-Al alloy (including 13 wt. % Fe), and welded on the surface of the substrate 2a metallographically by plasma powder welding. After the alloy layer 2b had been welded on the substrate shaft 2a, the shaft 2 was cut to 31 mm in diameter. Further, two symmetrically arranged groups of 32 V-shaped concave portions 3a and 3b with a width of 1.0 mm and a depth of 1.5 mm were formed by cutting on the outer circumferential surface of the alloy layer 2b so as to be arranged at regular angular intervals with an inclination angle with respect to the shaft axial direction. Therefore, a plurality of shape anisotropic portions 4a and 4b were formed between two of these concave portions 3a and 3b, respectively and further the substrate material was exposed at least the bottoms of the concave portions 3a and 3b. The shaft 2 thus formed was carburized in a gas at 910° C. for 2 hours, quenched and subsequently tempered.

The surface hardness of the substrate material exposed at the bottoms of the concave portions 3a and 3b was Hv 710, and the depth of effective hardened layer more than Hv 550 was 0.85 mm.

In this example, it is preferable to form the concave portions 3a and 3b over as wide a range as possible on the high magnetostrictive material 2b and to determine the width of the convex portions 4a and 4b, the space between the right and left concave portions 3a and 3b, the space between the right and left convex portions 4a and 4b, the space between the substrate end and the concave portions 3a and 3b, and the space between the substrate end and the convex portions 4a and 4b all to be 3 mm or less from the carburizing effect's point of view. The reason is as follows: although the depth of the effective hardened layer can be determined according to the treatment conditions (e.g. carburizing), since it is preferable to determine the depth to be 1.5 mm or less from the production standpoint, it is also preferable to determine the permeation spacing between the two adjacent shape anisotropic portions 4a and 4b to be 3 mm or less.

FIG. 4(b) shows a hardened layer (carburized layer) 8 of the substrate material 2a by the dotted area, which shows carbon permeated from the exposed bottoms of the concave portions 3a and 3b to under the high magnetostrictive alloy layer 2b by the hardening treatment (e.g. carburizing). Since the surface portion of the substrate material can be hardened uniformly as shown, it is possible to obtain a high yield point substrate 2a, thus improving the torque detectable range. In this example, it is not necessarily required that the substrate material is completely exposed all over the bottoms of the concave portions 3a and 3b. That is, no problem arises if the high magnetostrictive material 2b remains partially on the bottoms thereof.

Figure 4C:
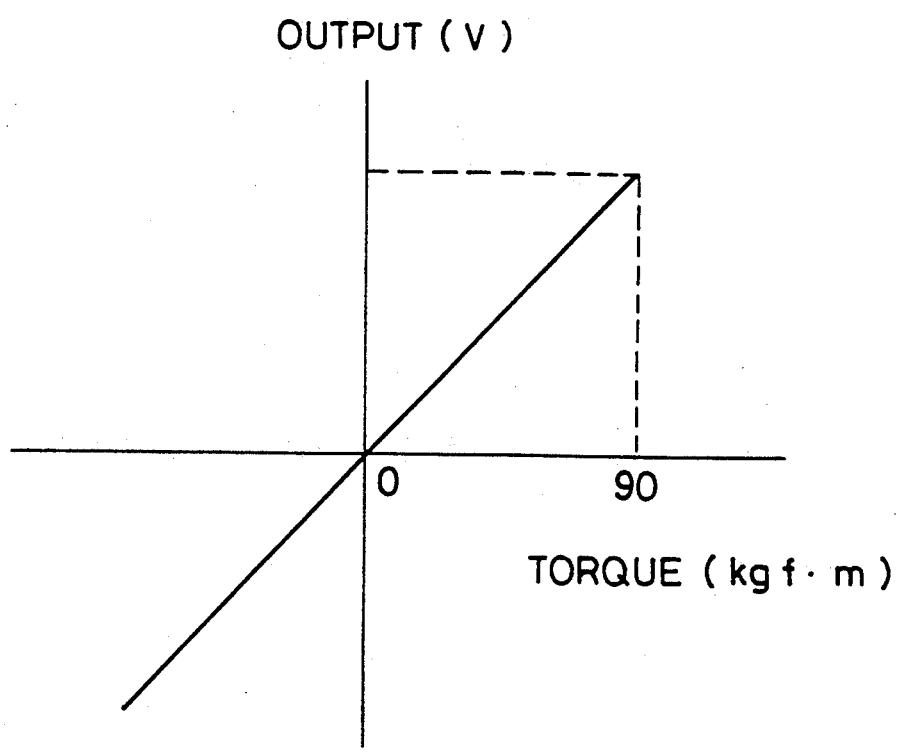
FIG. 4(c) is a graphical representation showing the torque-output characteristics of the shaft shown in FIG. 4(a)

FIG. 4(c) shows the torque-output characteristics of the above-mentioned Example 3, which indicates that the output is proportional to the torque over a wide range up to 90 kgf.m under excellent linear characteristics or without any saturation.

COMPARATIVE EXAMPLE 3A-C

Figure 5A:
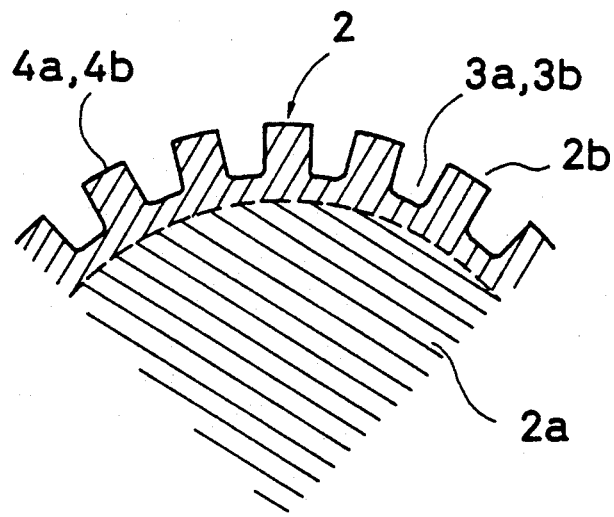
FIG. 5(a) is an enlarged cross-sectional view showing a comparative shaft.

FIG. 5(a) is an enlarged view showing the shape anisotropic portions 4a and 4b formed for comparison on the outer circumferential surface of the shaft 2. The substrate 2a of the shaft 2 was made of an alloy steel corresponding to JIS SCM 420 with a diameter of 27 mm. The alloy layer 2b was made of Fe-Al alloy (including 13 wt. % Al and 87 wt. % Fe), and fused with the surface of the substrate 2a metallographically by plasma powder welding. After the alloy layer 2b had been welded on the substrate 2a, the diameter of the shaft 2 was cut to 31 mm. Further, 32 concave portions 3a, each with a width of 1.0 mm and a depth of 1.5 mm, were formed by cutting on the outer circumferential surface of the alloy layer 2b so as to be located at regular angular intervals with an inclination angle with respect to the shaft axial direction. Therefore, a plurality of convex shape anisotropic portions 4a and 4b were formed between two of these concave portions 3a and 3b, respectively. The shaft 2 thus formed was carburized in a gas for 2 hours, quenched and subsequently tempered.

In this comparative example 3A-C, since the thickness of the high magnetostrictive material 2b was determined as 2 mm after the outer circumferential surface of the shaft 2 had been finished (cut away), the high magnetostrictive material 2b still remained at the bottoms of the concave portions 3a and 3b (i.e. the substrate material 2a was not exposed at the bottoms) even after the concave portions 3a and 3b having the same depth (1.5 mm) as the Example 3A were cut away, as depicted in FIG. 5(a). Therefore, the substrate material 2a were not carburized due to the presence of the high magnetostrictive material (Fe-Al alloy) 2b, so that the yield point of the substrate 2a were not be increased.

Figure 5B:
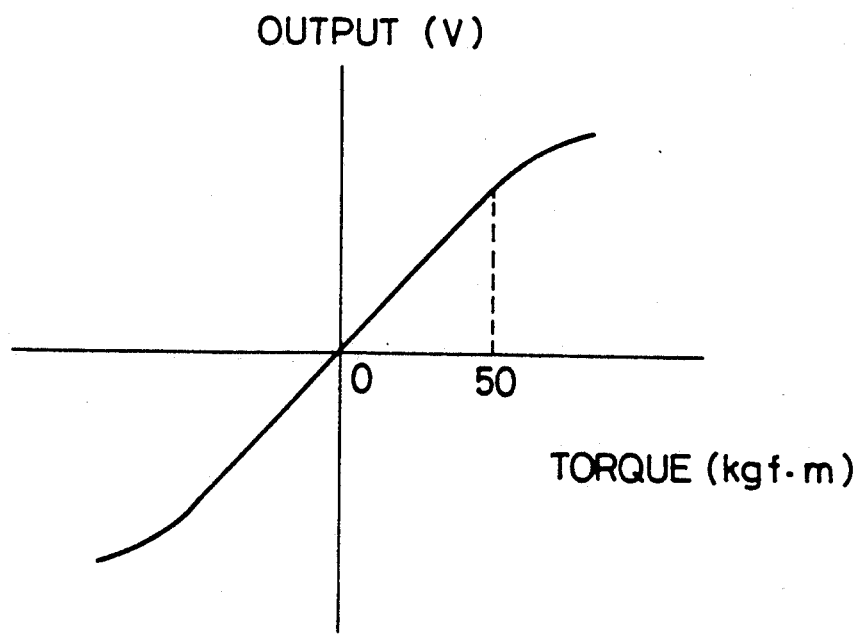
FIG. 5(b) is a graphical representation showing the torque-output characteristic of the comparative shaft shown in FIG. 5(a)

FIG. 5(b) shows the torque-output characteristics of the above-mentioned Comparative Example 3A-C, which indicates that the output is proportional to the torque within a narrow range up to 50 kgf.m, that is, saturated at a relatively low torque.

In comparison between the Example 3A and the Comparative Example 3A-C, in the case of the Example 3A it is possible to increase the measurable torque range about 1.8 times as wide as the Comparative Example 3A-C.

In the shaft 2 according to the present invention, since an alloy layer 2b of high magnetostrictive material is metallographically welded on a shaft substrate 2a of high yield point material hardened by carburizing or nitriding, it is possible to obtain stable linear torque-output characteristics for a long time over a wide torque range, without saturation of output signals. In addition, an excellent durability of more than 100 thousand times was verified as the result of fatigue tests without raising any problems such as peeling-off of the alloy layer 2b, abnormal outputs, etc.

EXAMPLE 3B

Figure 6A:
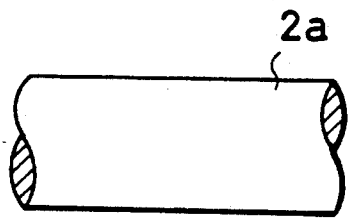
FIGS. 6(a) to 6(d) are illustrations explaining the manufacturing process of another modification of the third embodiment of the shaft according to the present invention.
Figures 1, 6B:
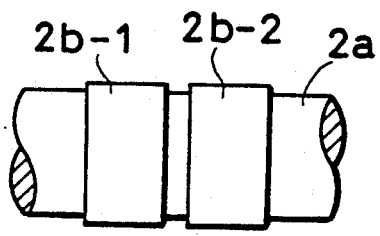
Figures 2, 6B:
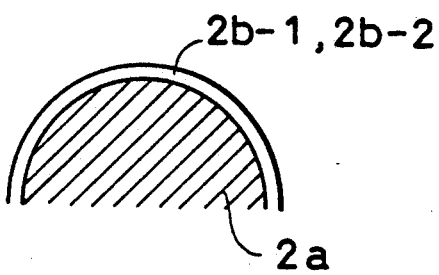
Figures 1, 6C:
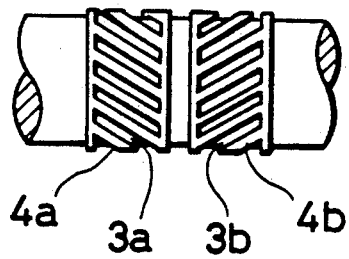
Figures 2, 6C:
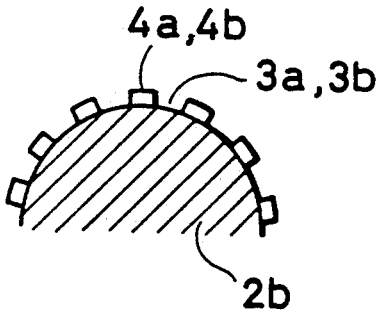
Figure 6D:
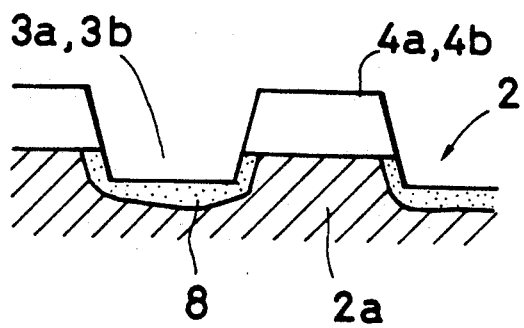

FIGS. 6(a) to 6(d) are enlarged views showing the shape anisotropic portions 4a and 4b formed on the outer circumferential surface of the shaft 2. The substrate 2a of the shaft 2 was made of an alloy steel corresponding to JIS SCM 420 with a diameter of 30 mm. The alloy layer 2b, made of Fe-Ni alloy (including 65 wt. % Ni and 35 wt. % Fe), was welded on the surface of the substrate shaft 2a metallographically by plasma powder welding, as shown in FIGS. 6(b)-1 and 6(b)-2, in such a way that two alloy layers 2b-1 and 2b-2 with a width of 15 mm and a thickness of about 1 mm were arranged at an interval of 8 mm. After the alloy layers 2b-1 and 2b-2 have been welded on the substrate 2a, a plurality of concave portions 3a with a width of 2 mm, an axial length of 13 mm and a depth of 1.2 mm were formed by cutting on the outer circumferential surface of the alloy layer 2b-1 so as to be arranged at regular angular intervals at an inclination angle with respect to the axial direction, and further a plurality of other concave portions 3b with the same width, length and depth were formed by cutting on the outer circumferential surface of the alloy layer 2b-2, so that a plurality of convex shape anisotropic portions 4a and 4b were formed between two of these concave portions 3a an 3b, respectively, as shown in FIGS. 6(c)-1 and 6(c)-2. Further, the substrate material 2a was exposed at least the bottoms of the concave portions 3a and 3b. The shaft 2 thus formed was carburized in a gas at 850° C. for one hour in order to form a hardened layer (carburized layer) 8 at the bottoms of the concave portions 3a and 3b, as depicted in FIG. 6(d).

COMPARATIVE EXAMPLE 3B-C1

In the same way as the Example 3B, the substrate 2a was made of JIS SCM 420 with a diameter of 30 mm. The alloy layer 2b made of F-Ni alloy was welded on the surface of the substrate shaft 2a by plasma powder welding in such a way that two padding layers with a width of 15 mm and a thickness of about 1 mm were arranged at an interval of 8 mm. Thereafter, a plurality of concave portions 3a and 3b with a width of 2 mm, an axial length of 13 mm and a depth of 1.2 mm, respectively, were formed by rolling (not by cutting), so that a plurality of convex shape anisotropic portions 4a and 4b were formed between two of these concave portions 3a and 3b, respectively.

COMPARATIVE EXAMPLE 3B-C2

The shaft 2 the same as the Comparative Example 3B-C1 except the substrate diameter of 50 mm was prepared.

Figure 7:
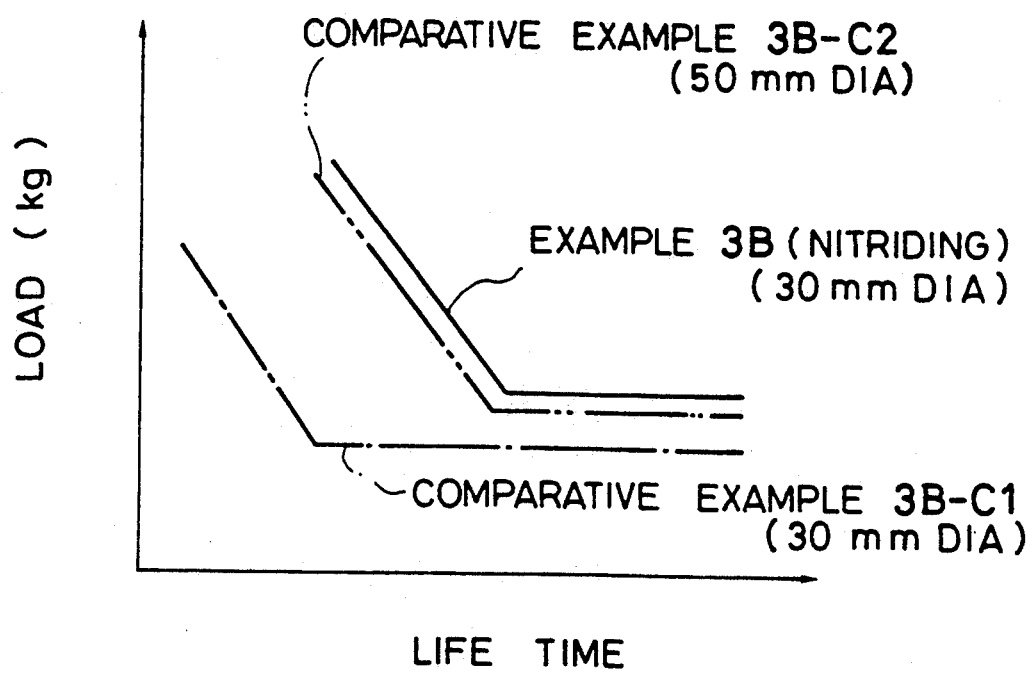
FIG. 7 is a graphical representation showing the load-life time characteristics of the shaft shown in FIGS. 6(a) to 6(d) in comparison with prior-art comparative shafts.

FIG. 7 shows the fatigue test results of these Examples 3B, 3B-C1 and 3B-C2. FIG. 7 indicates that the Example 3B (30 mm dia.) is much superior in fatigue limit and life to the Comparative Example 3B-C1 (30 mm dia.) and further to the Comparative Example 3B-C2 (50 mm dia.). Since the weight of the shaft with a diameter of 30 mm (Example 3B) is about 0.35 times of that of the shaft with a diameter of 50 mm (Comparative Example 3B-C2), the evaluation result indicates that it is possible to markedly reduce the weight of the shaft without reducing the fatigue strength, when the Example 3B is adopted for the torque detecting apparatus.

In the Example 3B, the hardness at the bottoms of the concave portions 3a and 3b was measured. The measured results were (Vickers hardness) Hv 700 or more. In addition, the depth of the carburized layer was 0.5 to 1.2 mm. Further, when the shaft manufactured on the basis of Example 3B was used to measure a torque applied to the shaft, it was verified that the shaft was provided with a practically sufficient magnetostrictive sensitivity.

In the Example 3B, the hardness at the bottoms of the concave portions 3a and 3b was Hv 700. However, since it is possible to consider that the fatigue test results can be improved when the hardness at the bottom of the concave portions is at least Hv 600, the hardening method is not necessarily limited only to carburizing. That is, other hardening methods such as carbonitrizing, nitrizing, etc., can be adopted to obtain the same effect as that of the Example 3B.

To confirm the above-mentioned effect, the shaft 2 with a hardness of Hv 600 or more at the bottoms of the concave portions 3a and 3b was manufactured by diffusing resolved nitrogen at 510° C. for 27 hours within an atmosphere including 80% NH3 gas. The same fatigue test was made to the shaft thus manufactured. The test results were similar to those obtained by the shaft hardened by carburizing, as shown in FIG. 7. Further, it was confirmed that the magnetostrictive sensitivity was not deteriorated by nitriding.

In summary, where the shaft 2 as explained in the Example 3B is incorporated with the torque detecting apparatus, it is possible to improve the fatigue strength and torque measurement reliability without deteriorating the detection sensitivity.

The fourth embodiment of the torque detecting apparatus will be described hereinbelow with reference to FIGS. 8(a) to 9(b).

When the shaft, including a substrate shaft made of a high yield point material, and an alloy layer made of a high magnetostrictive material is heat-treated for hardening, for instance, there exists a problem in that cracks are easily produced in the high magnetostrictive material 26, in particular, at the boundary portions between the concave portions 3a, 3b and the surface of the alloy layer (the convex portions 4a and 4b) when Fe-Al alloy is used as the magnetostrictive material, thus resulting in low productivity. This is because when quenched the shaft is locally contracted and expanded due to abrupt temperature changes, and further internal stress is concentrated at the boundary portions between the concave and convex portions.

The fourth feature of the present invention is to provide a shaft formed with shape anisotropic portions free from cracks produced when the shaft is heat treated and suitable for mass production, while providing stable wide-range torque-output characteristics.

To realize the above-mentioned feature, the concave portions of the shaft are formed smoothly in cross section along continuous curved lines in both longitudinal and transversal axes of the concave portions in such a way as to provide an inclination angle of more than 10 degrees with respect to the normal of the outer surface of the alloy layer.

EXAMPLE 4

Figure 8A:
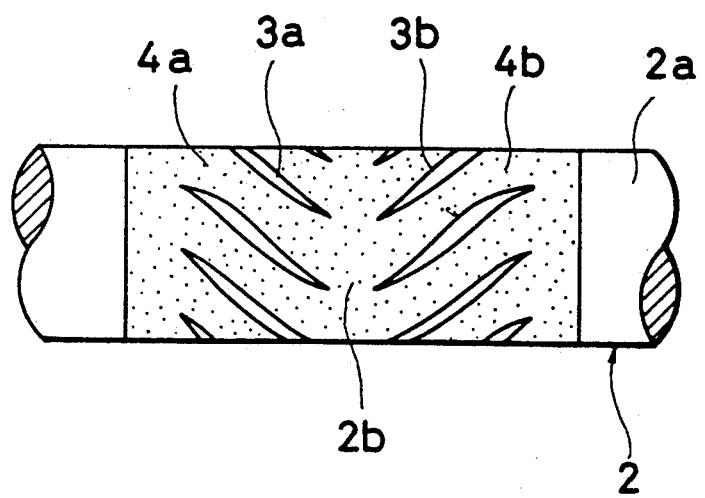
FIG. 8(a) is an enlarged plan view showing the fourth embodiment of the shaft according to the present invention.

FIG. 8(a) is an enlarged views showing the shape anisotropic portions 4a and 4b formed on the outer circumferential surface of the shaft 2. The substrate shaft 2a of the shaft was made of an alloy steel corresponding to JIS SCM 420, with a diameter of 29 mm. The high magnetostrictive alloy layer 26 was made of Fe-Al alloy (including 13 wt. % Al and 87 wt. % Fe), and welded on the surface of the substrate 2a metallographically by plasma powder welding. After the alloy layer 26 had been welded on the substrate 2a, the shaft was cut to 31 mm in diameter. Further, two symmetrically arranged groups of 32 V-shaped concave portions 3a were formed on the outer circumferential surface of the alloy layer 2b by hobbing with a hobbing machine having a 32 mm dia. hob so as to be arranged at regular angular intervals at an inclination angle of 45° with respect to the shaft axial direction. Therefore, a plurality of shape anisotropic portions 4a and 4b were formed between two of these concave portions 3a and 3b, respectively.

Figure 8C:
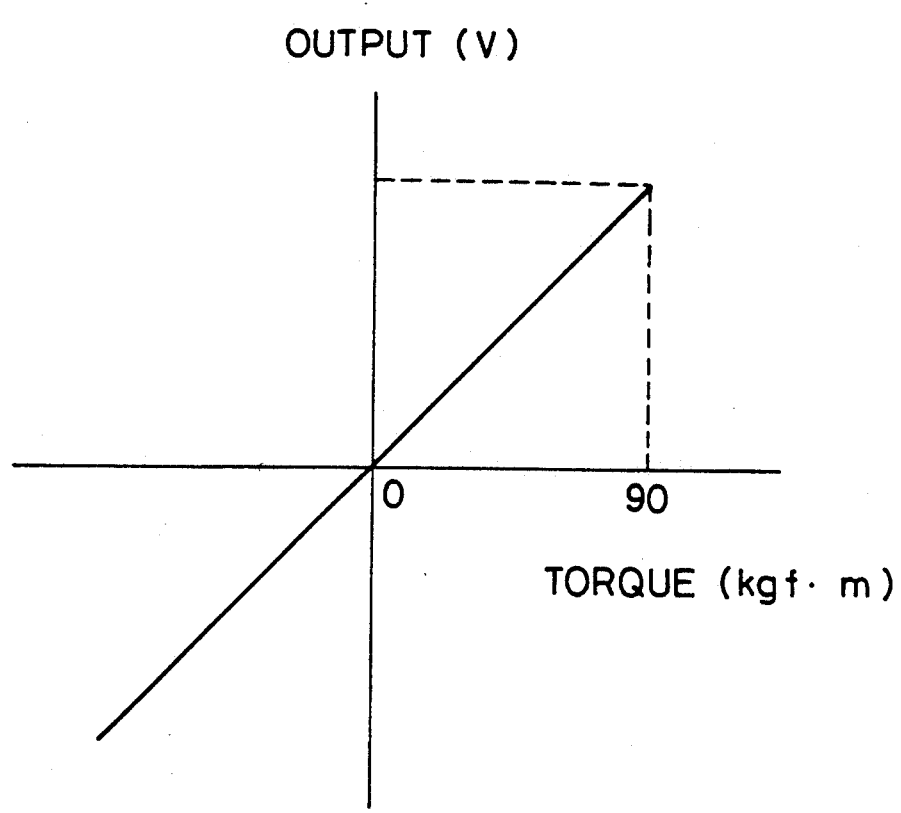

FIG. 8(b)-A is a plan view showing one concave portion 3a and 3b; FIG. 8(b)-B is a cross-sectional view taken along the longitudinal axis of the concave portion; and FIG. 8(b)-C is a cross-sectional view taken along the transversal axis of the same concave portion. In FIG. 8(b)-B, the radius of curvature of the bottom of the concave portion 3a was about R=30 mm along the longitudinal axis direction. In FIG. 8(b)-C, the maximum width along the transversal axis was about 1 mm; the maximum depth of the concave portion was about 1 mm, and the inclination angle of the side wall portion was $\theta = 20°$.

In FIG. 8(b)-C, both wall surfaces of the concave portion 3a or 3b are defined by straight lines. Without being limited thereto, however, it is, of course, possible to form the wall surfaces of the concave portion 3a in an involute tooth profile fashion by use of an involute hob.

Thereafter, the shaft was heated up to 850° C.; quenched in an oil of 80° C., and then tempered at 170° C. The presence or absence of cracks due to quenching was checked by coloring the shaft; however, no cracks were checked at the boundary portions between the convex and concave portions 3a, 3b and 4a, 4b of the high magnetostrictive material.

FIG. 8(c) shows the torque-output characteristics of this Example 4, which indicates a wide linear characteristic up to a high torque of 90 kgf.m.

COMPARATIVE EXAMPLE 4C

The same shaft as the Example 4 was prepared, and concave portions 3a and 3b were formed on the outer circumferential surface of the alloy layer by cutting with an end mill.

Figure 9B:
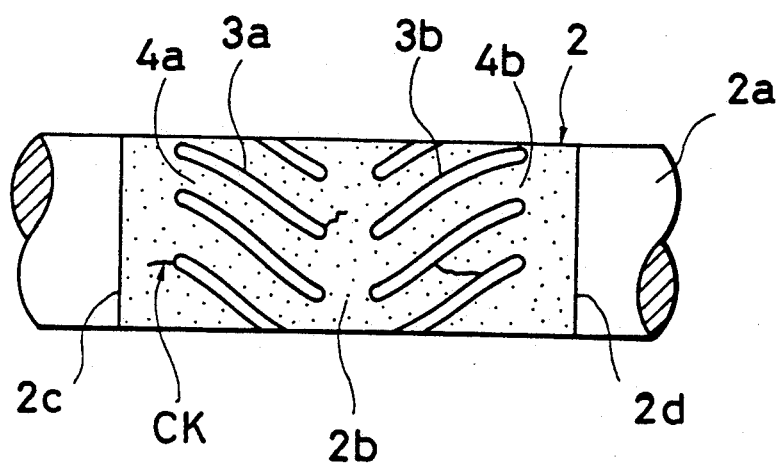

FIG. 9(a)-A is a plan view showing one concave portion 3a or 3b; FIG. 9(a)-B is a cross-sectional view taken along the longitudinal axis of the concave portions; and FIG. 9(a)-C is a cross-sectional view taken along the transversal axis of the same concave portion. In FIG. 9(a)-B, the bottom and the side wall surfaces of the concave portion 3a were of straight. In FIG. 9(a)-C, the width along the longitudinal axis was about 1 mm; the maximum depth of the concave portion was about 1 mm; and the side wall surfaces of the concave portion 3a and 3b were vertical with respect to the surface of the alloy layer ($\theta = 0$).

Further, the shaft was heat treated in the same way as with the case of the Example 4. The presence or absence of cracks due to quenching was checked by coloring the shaft. There cracks CK were recognized at the boundary portions between the convex and concave portions of the high magnetostrictive material, as depicted in FIG. 9(b).

The fifth embodiment of the torque detecting apparatus will be described hereinbelow with reference to FIGS. 10(a) to 11(b).

When the shaft including a substrate made of a high yield point material and an alloy layer made of a high magnetostrictive material is heat-treated for hardening, for instance, there exists a problem in that cracks are easily produced in the high magnetostrictive material 2b, at the fusion boundary portions between the substrate 2a and the alloy layer 2b, in particular at both the axial magnetostrictive material, thus resulting in low productivity. This is because when quenched the shaft is locally contracted and expanded due to abrupt temperature change and further internal stress is concentrated at the fusion boundary portions at both the axial ends of the alloy layer 2b.

The fifth feature of the present invention is to provide a shaft formed with shape anisotropic portions free from cracks produced at the fusion boundary portions when the shaft is heat treated and suitable for mass production, while providing stable wide-range torque-output characteristics.

To realize the above-mentioned feature, the alloy layer of magnetostrictive material is formed into trapezoidal or arcuated shape in longitudinal cross section so as to provide an inclination angle of more than 30 degrees with respect to the normal of the surface of the shaft at least on both axial ends of the alloy layer 2b.

EXAMPLES 5A, 5B and 5C

Figure 10A:
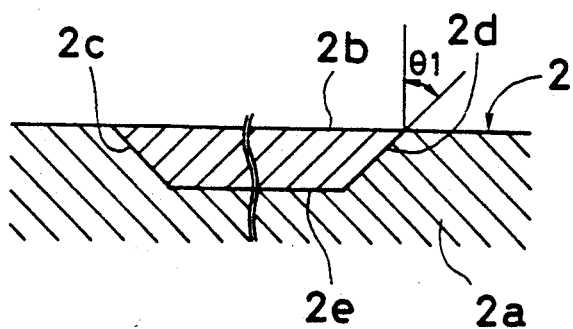
FIG. 10(a) is a longitudinal cross-sectional view showing a fifth embodiment of the shaft according to the present invention.

The substrate shaft 2a of the shaft 2 was made of an alloy steel corresponding to JIS SCM 440, with a diameter of 32 mm. Further, the substrate was cut so as to form a wide groove with a depth of more than 1 mm over the circumferential surface of the substrate shaft 2a. The three kinds of wide grooves shown in FIGS. 10(a), (b) and (c) were cut in the substrate shaft 2a as follows:

FIG. 10(a) is a longitudinal cross-sectional view showing a first Example 5A, in which the axial end portions 2c and 2d of the magnetostrictive material were inclined at an angle of $\theta_1 = 45$ degrees in a straight line, and the bottom portion 2e thereof was also formed in a straight line. Further, it is preferable to smoothly connect two corner portions between the bottom surface 2e and the two wall surfaces 2c and 2d.

Figure 10B:
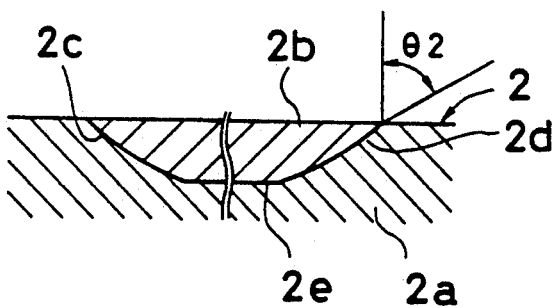
FIG. 10(b) is a longitudinal cross-sectional view showing a first modification of the fifth embodiment of the shaft according to the present invention.

FIG. 10(b) is a longitudinal cross-sectional view showing a second Example 5B, in which the axial end portions 2c and 2d of the magnetostrictive material were inclined at an angle of $\theta_2 = 70$ degrees along a curved line and the bottom portion 2e thereof is formed in a straight line.

Figure 10C:
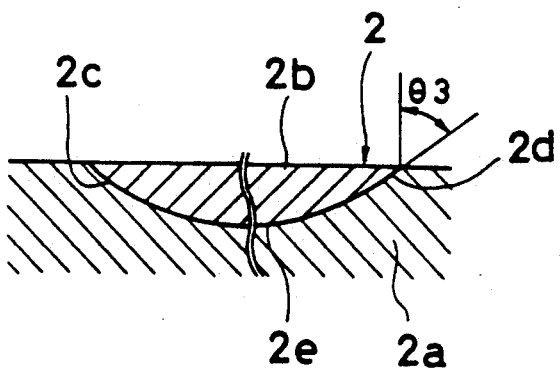
FIG. 10(c) is a longitudinal cross-sectional view showing a second modification of the fifth embodiment of the shaft according to the present invention.

FIG. 10(c) is a longitudinal cross-sectional view showing a third Example 5C, in which all the fusion boundary portions 2c, 2d and 2e were formed in a continuously curved or an arcuate line, and the axial end portions 2a and 2d of the magnetostrictive material are inclined at an angle of $\theta_3 = 60$ degrees along the arcuate line.

The high magnetostrictive alloy layer 2b was made of Fe-Al alloy (including 13 wt. % Al and 87 wt. % Fe), and fused metallographically with the surface of the wide groove formed as described above in the substrate 2a by plasma powder welding. After the alloy layer 2b had been welded on the substrate 2a, the shaft was cut to 31 mm in diameter.

Further, two symmetrically arranged groups of 32 V-shaped spiral concave portions 3a with a width of 1 mm and a depth of 1 mm were formed on the outer circumferential surface of the magnetostrictive material by cutting so as to be arranged at regular-angular intervals at an inclination angle of 45 degrees with respect to the shaft axial direction. Therefore, a plurality of convex shape anisotropic portions 4a and 4b were formed between two of these concave portions 3a and 3b, respectively.

Thereafter, the shaft was heated up to 850° C.; quenched in an oil at 80° C., and then tempered at 170° C. The presence or absence of cracks due to quenching was checked by coloring the shaft; however, no cracks were detected at the boundary portions between the substrate 2a and the alloy layer 2b at both axial ends of the alloy layer 2b.

The torque-output characteristics of Examples 5A, 5B and 5C were wide linear characteristics up to a high torque of 90 kgf.m, as shown in FIG. 4(c).

COMPARATIVE EXAMPLE 5-C

The same shaft as the Examples 5A, 5B and 5C was prepared, except that the longitudinal cross-section shape of the wide groove was formed in the magnetostrictive material.

Figure 11A:
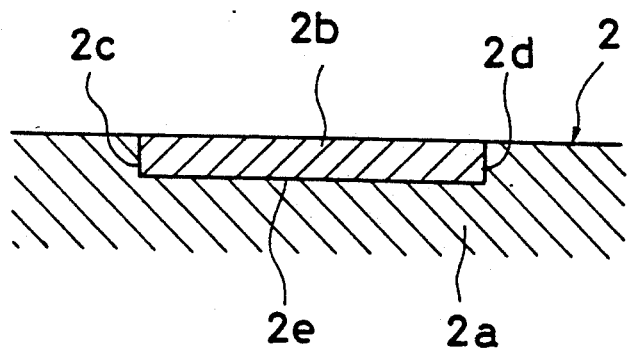
FIG. 11(a) is a longitudinal cross-sectional view showing a comparative shaft.

FIG. 11(a) is a longitudinal cross-sectional view showing the Comparative Example 5-C, in which the axial end portions 2c and 2d of the magnetostrictive material was cut vertically with respect to the surface of the shaft at an inclination angle of $\theta = 0$ degrees and the bottom portion 20 thereof was also formed in a straight line. The depth of the wide groove was 1 mm, as in the Examples 5A, 5B and 5C.

Figure 11B:
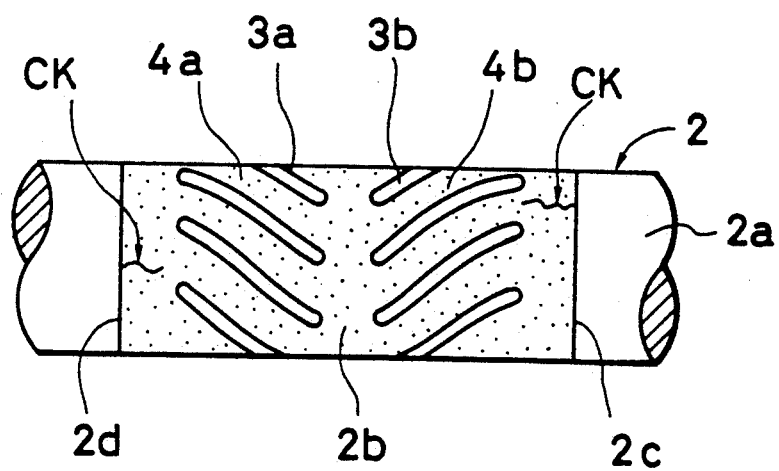
FIG. 11(b) is an enlarged plan view showing the comparative shaft, in which cracks are shown.

Further, 32 concave grooves with a width of 1 mm and a depth of 1 mm were formed. The shaft was heat-treated in the same way as with the case of the Examples 5A, 5B and 5C. The presence or absence of cracks due to quenching was checked by coloring the shaft. Three cracks CK were recognized at the boundary portions between the substrate 2a and the alloy layer 2b at both the axial ends of the high magnetostrictive material, as depicted in FIG. 11(b).

The six embodiment of the torque detecting apparatus according to the present invention will be described hereinbelow with reference to FIGS. 12 to 15(e).

Figure 12:
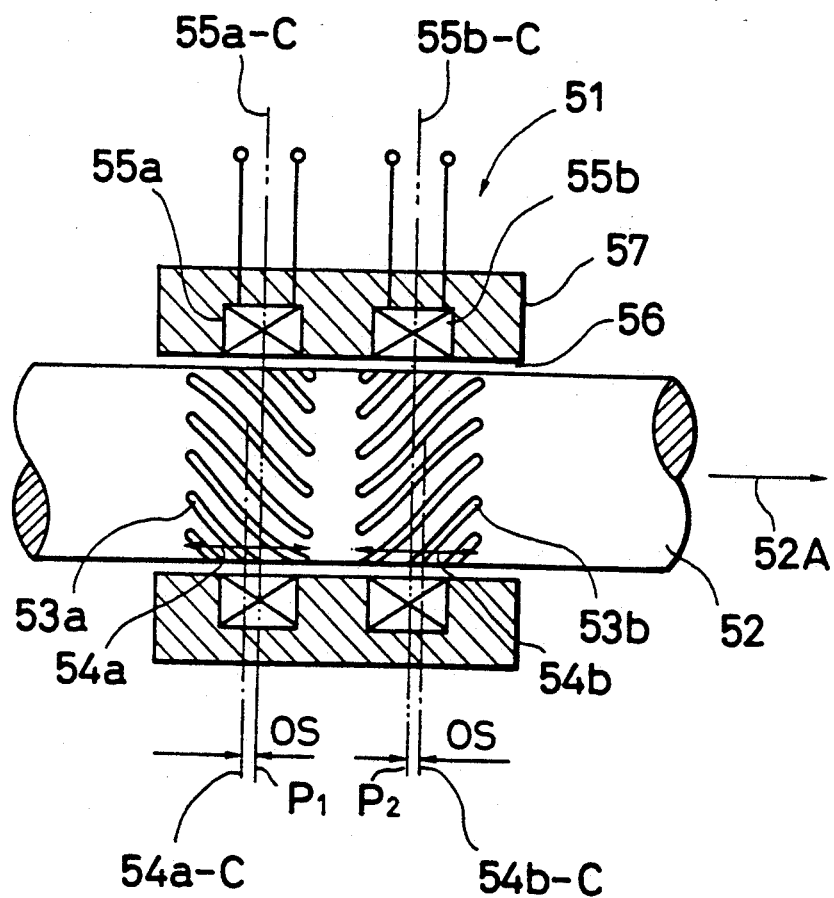
FIG. 12 is a fragmentary longitudinal cross-sectional view showing a prior-art magnetostrictive torque detecting apparatus.

FIG. 12 shows an example of a prior-art torque detecting apparatus as disclosed Japanese Published Unexamined (Kokai) Pat. Appli. No. 2-107910. It comprises roughly a shaft 52 made of a magnetostrictive material, a pair of coils 55a and 55b (exciting and detecting means), and a yoke 57 made of high permeability material and arranged with a gap 56 relative to the shaft 52. The shaft 52 to be measured is formed with two symmetrically arranged groups of V-shaped concave portions 53a and 53b arranged at regular angular intervals on the outer circumferential surface of the shaft at an inclination angle (e.g. 45 degrees) with respect to the shaft axial direction. In these shape anisotropic portions, the change in permeability becomes maximum when torsional stress is produced in a specific direction.

The shaft is made of a mechanical or structural steel having a high yield point and a low magnetostrictive sensitivity (e.g. JIS SC, SCM, SNCM steels, etc. whose magnetostrictive characteristics are improved) or a low yield point and a high magnetostrictive sensitivity (e.g. Fe-Al, Fe-Ni, Fe-Co alloys, etc.).

Figure 13A:
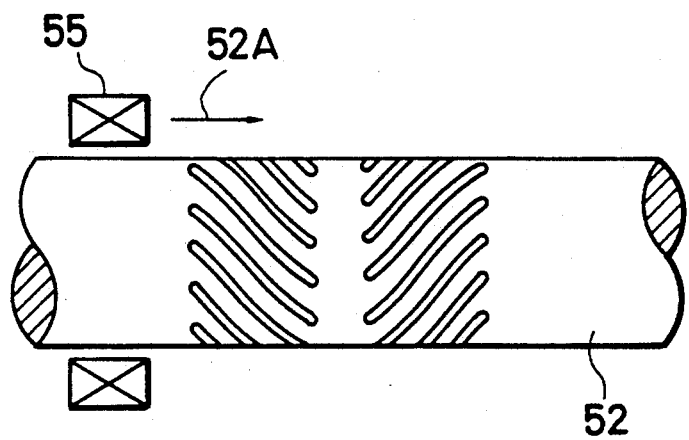
FIG. 13a) is an illustration for assistance in explaining the method of measuring coil characteristics.
Figure 13B:
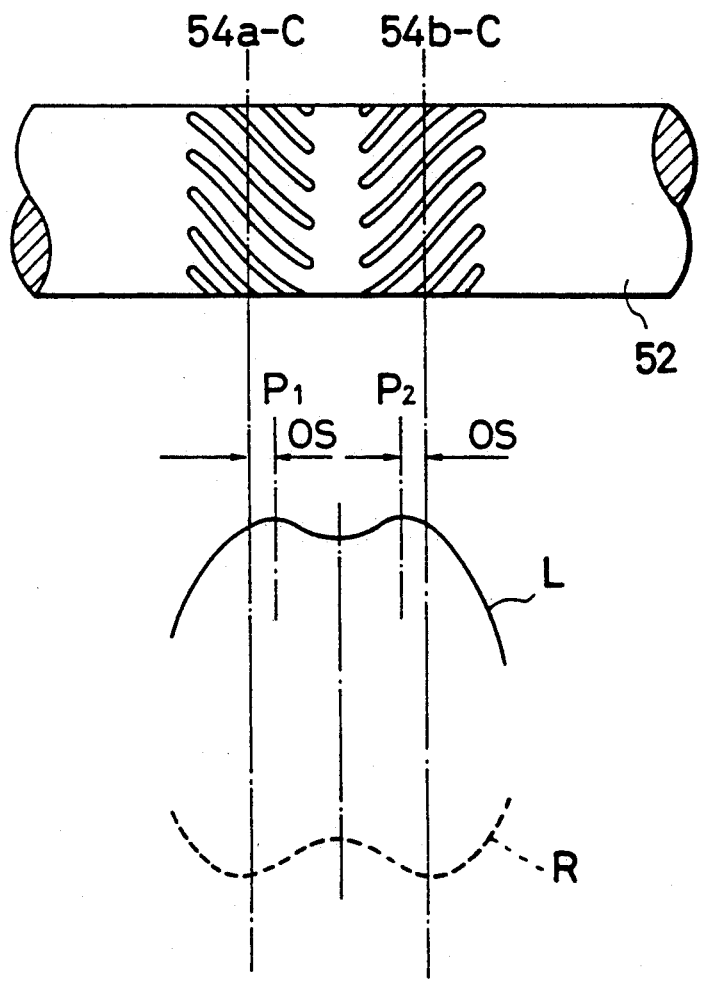
FIG. 13(b) is an illustration showing prior art coil characteristics according to the coil position relative to the shaft.

In prior-art shaft 52 as described above, when a single coil 55 is shifted along the axial direction 52A of the shaft 52 as shown in FIG. 13(a), the inductance component L and the resistance component R of the impedance $Z = R + jwL$ induced in the coil by a high frequency signal (e.g. 10 to 100 kHz) change as depicted in FIG. 13(b). In the drawing, it should be noted that the maximum points P1 and P2 of the inductance component L (which occupies the major part of the impedance at the high frequency signal) are offset by OS inward from the central positions 54a-C and 54b-C of a pair of the shape anisotropic portions 54a and 54b, respectively.

Therefore, the coils 55a and 55b must be arranged being offset by OS inward from the central positions 54a-C and 54b-C of the shape anisotropic portions 54a and 54b, respectively, as shown in FIG. 12, so that the central positions 55a-C and 55b-C of the coils 55a and 55b are located at the maximum inductance component points P1 and P2.

The torque detection principle by the magnetostrictive torque detecting apparatus shown in FIG. 12 will be described in more detail hereinbelow with reference to FIG. 1(b) again. In FIG. 1(b), a bridge circuit is formed by these two coils 55a and 55b and two resistors 11a and 11b. An alternating voltage (Vin) 13 is applied across the two junction points C and D and a differential amplifier 14 is connected across the two junction points A and B to obtain an output voltage $V_D = V_B - V_A$ where $V_A$ and $V_B$ denote the voltages at the junction points A and B, respectively. Further, with reference to FIG. 12, a magnetic circuit can be formed by way of the yoke 57, the gap 56, the shape anisotropic portions 54a and 54b, the gap 56 and the yoke 57 again around the two coils 55a and 55b.

Under these conditions, when a torque T is applied to the shaft 52. A tensile stress is produced in one shape anisotropic portion 54a formed by the grooves 53a and a compressive stress is produced in the other shape anisotropic portion 54b formed by the grooves 53b, for instance. Therefore, when the shaft 52 is made of a material having a positive magnetostrictive constant, the permeability of the shaft 52 is increased by the tensile stress and decreased by the compressive stress, so that the inductance $L_A$ of the coil 55a increases and the inductance $L_B$ of the coil 55b decreases. When a torque opposite to the above is applied to the shaft 52, the conditions are reversed. As a result, when a torque T is applied to the shaft when a constant alternating voltage (Vin) is applied to the bridge circuit as shown in FIG. 1(b), it is possible to obtain an output voltage $V_D V_B - V_A$ through the differential amplifier 14. The obtained output voltage $V_D$ is proportional to the torque T applied to the shaft as shown by a curve A in FIG. 13(C).

As already explained, since the central positions 55a-C and 55b-C of the coils 55a and 55b are located at the maximum inductance component points P1 and P2 as shown in FIG. 12, it is possible minimize the changes in inductance components L of the coils when the coils are shifted along the shaft axial direction due to a mechanical play, for instance. As a result, it is possible to minimize the error $\Delta V_0$ shown in FIG. 13(c) in the output voltage $V_D$ or the torque-output characteristics due to the axial play of the shaft 52.

However, the above-mentioned offset value OS is subjected to the influence of various magnetic characteristics, such as the shapes of the shape anisotropic portions, the permeability of the material thereof, local distortion of the permeability thereof due to heat treatment, etc. Therefore, it is necessary to determine the above-mentioned offset value OS whenever the dimensions and the materials of the shaft 52 are modified. However, whenever the shapes and magnetic characteristics of the shaft 52 change unintentionally, the offset value OS also varies and then the maximum inductance component points P1 and P2 are not located at the central positions 55a-C and 55b-C of the coils. Therefore, there exists a problem in that the error $\Delta V_0$ shown in FIG. 13(c) cannot be minimized by the prior art in such a case as described above.

Figure 13C:
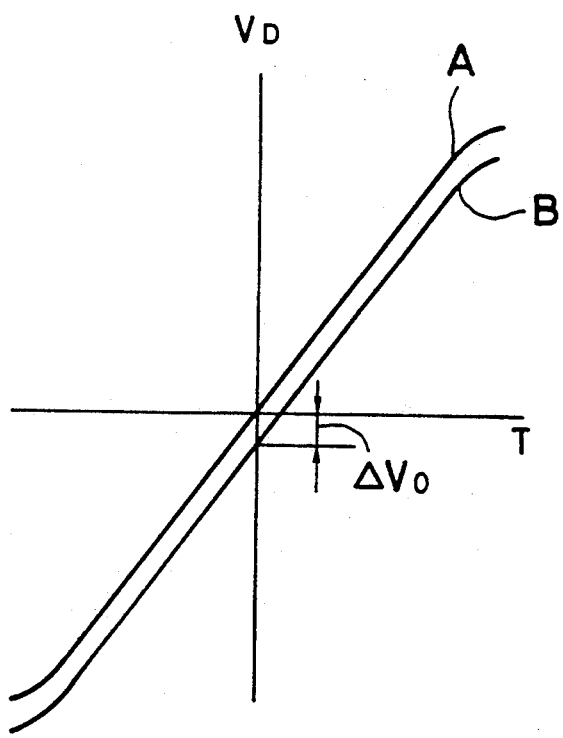
FIG. 13(c) is a graphical representation showing the torque-output characteristics of the torque detecting apparatus.

In the shaft according to the present invention, since the shaft is formed of a substrate 2a made of a high yield point material and an alloy layer 2b made of a high magnetostrictive material in such a way that the high magnetostrictive material 2b is welded metallographically on the substrate 2a, it is rather difficult to make the magnetic characteristics uniform over the wide range of a pair of the shape anisotropic portions 4a and 4b shown in FIG. 1. Therefore, there exists a problem in that the positions P1 and P2 (at which the inductance components L of the coils 5a and 5b are maximum) change according to the shaft 2. Therefore, when the shaft 2 is moved relative to the coils 5a and 5b in the axial direction, there exists a problem in that the error $\Delta V_0$ of the torque-output characteristics inevitably increases as shown in FIG. 13(c). In addition, the positions P1 and P2 change according to the lots of the magnetostrictive material. To overcome the above-mentioned problem, the relative positional relationship between the shaft and the coils must be adjusted shaft by shaft, thus reducing the productivity thereof.

The sixth feature of the present invention is to reduce the error $\Delta V_0$ of the torque-output characteristics caused when the shaft is axially shifted relative to the coils, without adjusting the positions of the coils.

Figure 14A:
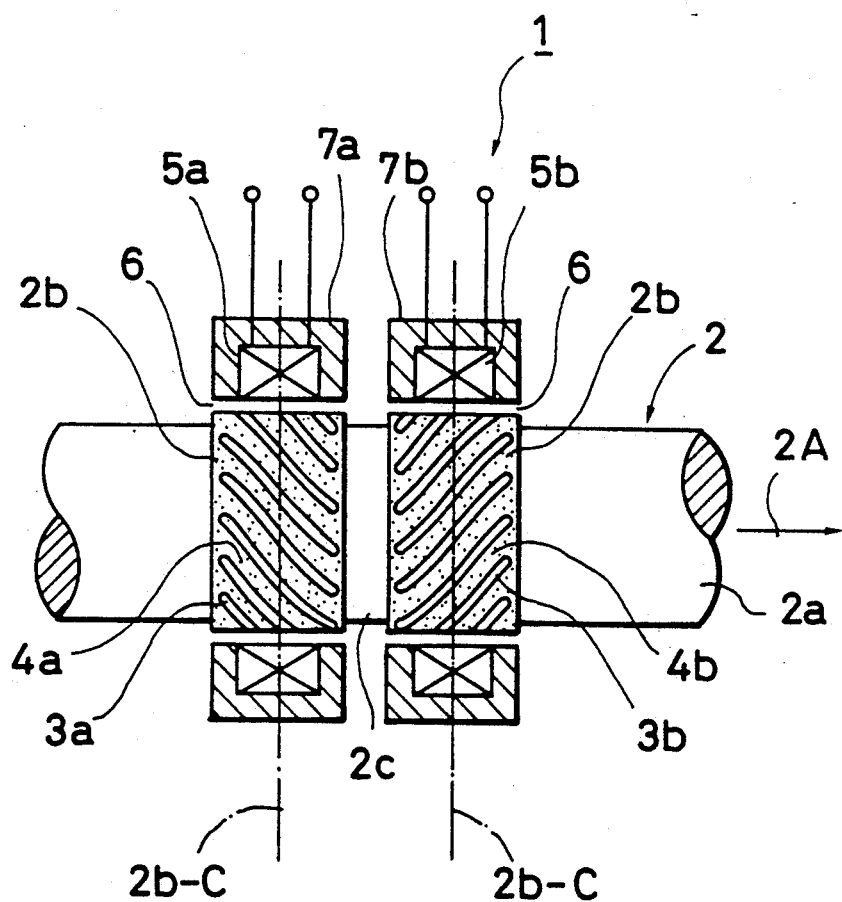
FIG. 14(a) is a fragmentary longitudinal cross-sectional view showing a sixth embodiment of the magnetostrictive torque detecting apparatus according to the present invention.

To realize the sixth feature, a pair of two shape anisotropic portions 5a and 5b are isolated magnetically, and additionally the two coils 5a and 5b are located at the central positions 2b-C (as shown in FIG. 14(a)) of the shape anisotropic portions 5a and 5b, respectively without being offset.

The reason is as follows: when a pair of two opposing symmetrical shape anisotropic portions 4a and 4b are arranged so as to form a single magnetic circuit, the change in inductance component L of the coil 5a or 5b is caused by not only the shape anisotropic portion 4a or 4b but also the opposing shape anisotropic portion 4b or 4a. That is, the changes in inductance L of the two coils caused by the two opposed shape anisotropic portions exert influence upon each other, so that the above-mentioned offset values OS must be determined under due consideration of variance in magnetic characteristics due to shape, permeability, local distortion of the shape anisotropic portions. Therefore, when the mutual relationship between the two shape anisotropic portions are isolated from each other, it is possible to reduce the mutual harmful influence upon each other due to differences in the magnetic characteristics of the shape anisotropic portions.

FIG. 14(a) shows a sixth embodiment of the torque detection apparatus according to the present invention, in which the alloy layer 2b of shape anisotropic portions are divided into two portions spaced by an isolating material 2c whose permeability is lower than that of the high magnetostrictive material. In this embodiment, the isolating material 2c can be formed by exposing the substrate shaft 2a. In addition, two exciting and detecting coils 5a and 5b housed in two different yokes 7a and 7b are arranged so as to surround the two shape anisotropic portions 4a and 4b, separately.

EXAMPLE 6A

Figure 14B:
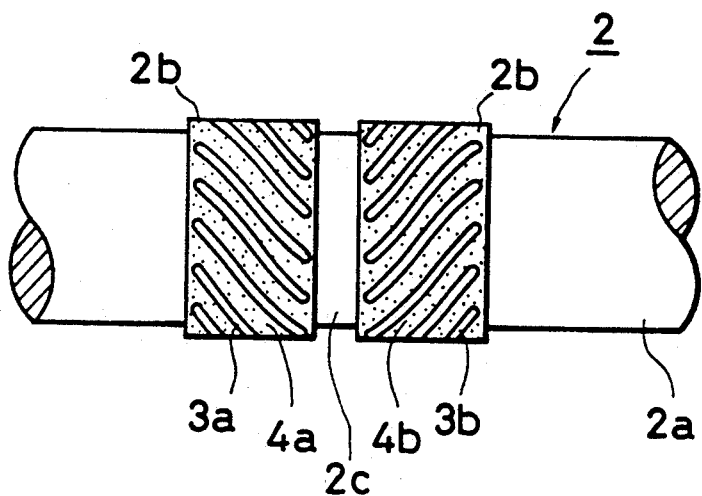
FIG. 14(b) is an enlarged plan view showing the shape anisotropic portions formed on the circumferential surface of the shaft shown in FIG. 14(a)
Figure 14C:
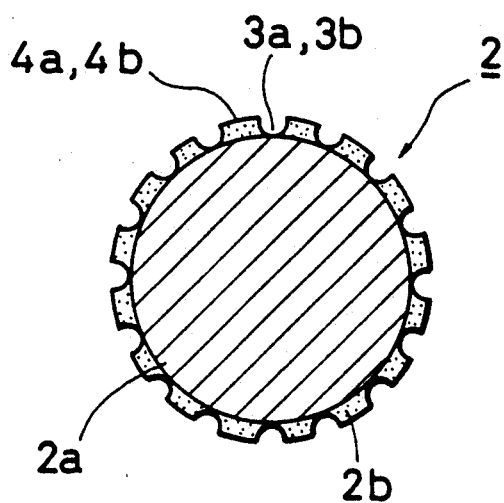
FIG. 14(c) is an enlarged cross-sectional view showing the same portion shown in FIG. 14(a)
Figure 14D:
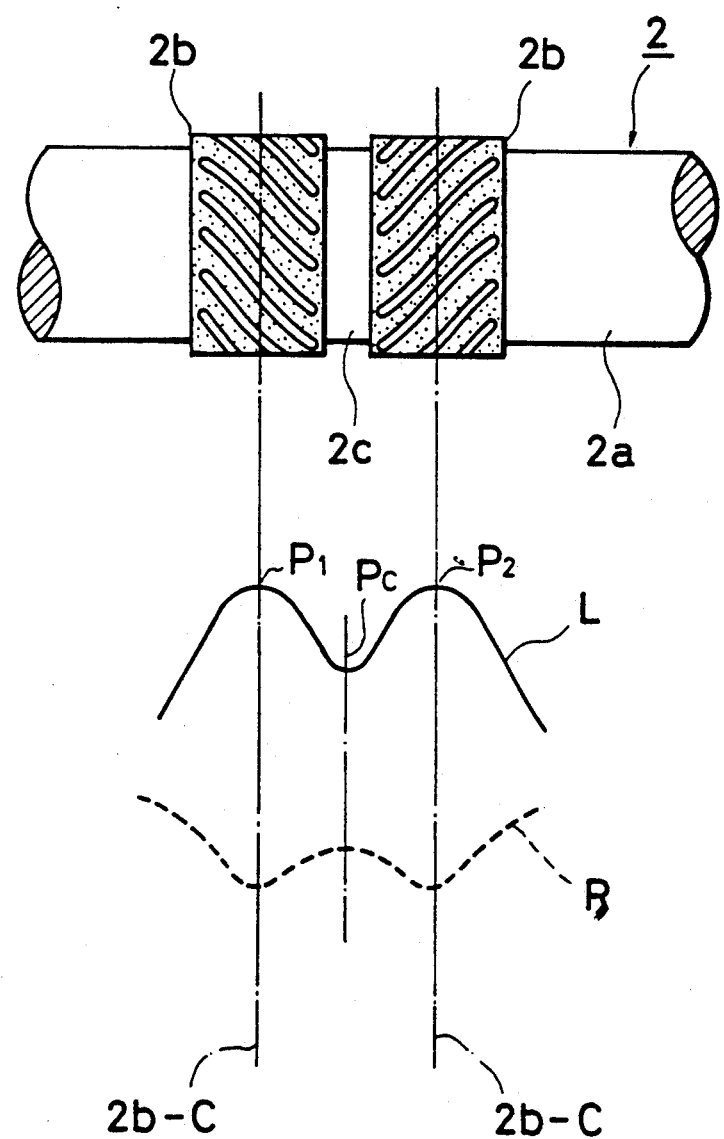
FIG. 14(d) is an illustration for assistance in explaining the coil characteristics according to the coil position relative to the shaft shown in FIG. 14(b)

FIGS. 14(b) and 14(c) are enlarged views showing the shape anisotropic portions 4a and 4b formed on the outer circumferential surface of the shaft 2. The substrate shaft 2a was made of a carbon steel corresponding to JIS S25C with diameter of 31 mm and hardened by carburization. The high magnetostrictive alloy layer 2b with an axial width of 20 mm and made of Fe-Ni alloy (including 45 wt. % Ni and 55 wt. % Fe) was welded on the surface of the substrate 2a metallographically by TIG welding. The alloy layer 2b was cut to 35 mm in diameter. Further, two symmetrically arranged groups of 32 V-shaped concave portions 3a and 3b with a width of 1.5 mm and a depth of 1.5 mm, respectively were formed by the rolling method on the outer circumferential surface of the alloy layer 2b so as to be arranged at regular angular intervals with an inclination angle with respect to the shaft axial direction. Therefore, a plurality of shape anisotropic portions were formed between two of these concave portions 3a and 3b, respectively.

Thereafter, a low-permeability portion 2C with an axial width of 5 mm was formed at the center of the high magnetostrictive alloy layer 2b with a width of 20 mm by cutting to expose the surface of the substrate 2a.

In the same way as shown in FIG. 13(a), a single coil 55 was shifted in the axial direction of the shaft 2 to measure the inductance component L of the impedance of the coil 55. In this embodiment, the inductance L and the resistance R of the impedance $Z = R + jwL$, induced in the coil by a high frequency signal change as depicted in FIG. 4(d). In the drawing, the maximum points P1 and P2 of the inductance component L are located at the two central positions 2b-C of the two shape anisotropic portions 2b, respectively. This indicates that the low permeability portion 2c serves as a magnetic resistance between the two shape anisotropic portions 5a and 5b.

In this example, the axial width of the low permeability portion 2c was 5 mm, and the inductance value Pc at the center of the low permeability portion 2c was 93% of the maximum inductance value P1 or P2. Therefore, in this example, the two coils 5a and 5b can be located at the two central positions 2b-C of the two high magnetostrictive shape anisotropic portions 2b, respectively.

Figure 14E:
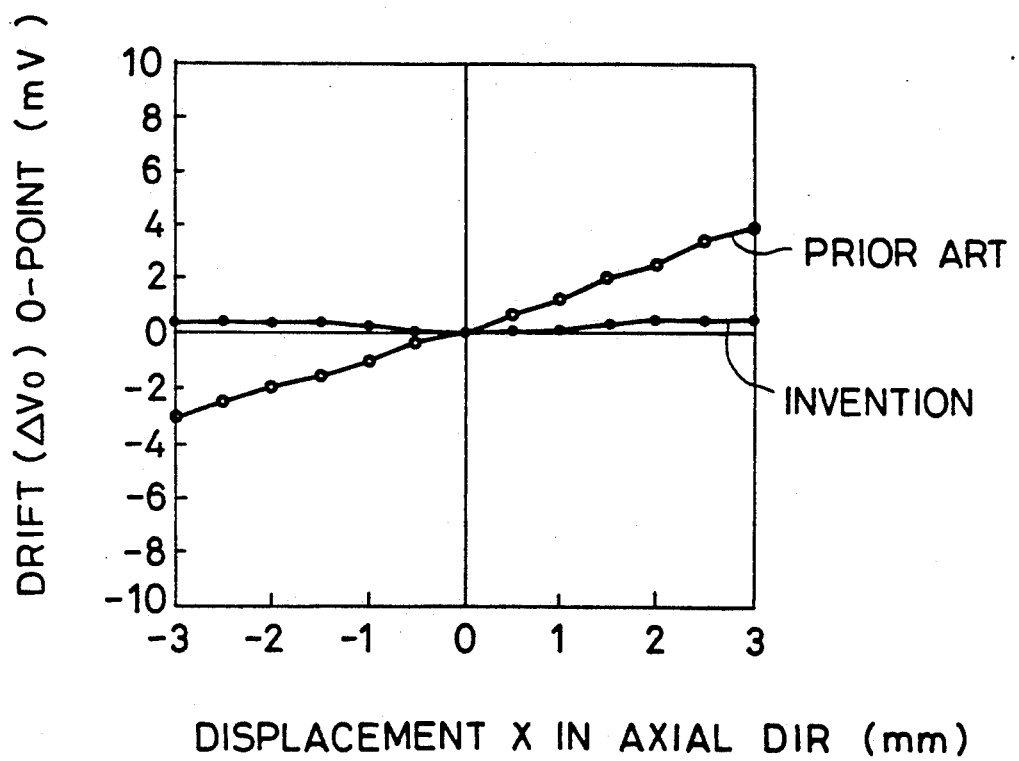
FIG. 14(e) is a graphical representation showing the relationship between the shaft displacement and the zero-point drift voltage of the detecting apparatus shown in FIG. 14(a) in comparison with the prior-art apparatus.

FIG. 14(e) shows the relationship between the drift voltage (mV) at the zero-torque point and the shaft displacement X (mm) in the axial direction, which indicates that the drift voltage can be reduced markedly in this embodiment, as compared with the prior-art shaft, and therefore the positional adjustment of the coils is unnecessary. Further, in FIG. 14(e), each dot indicates an average value of several tens of test sample shafts 2. In these test sample shafts, the maximum inductances L thereof were all located at the central positions of the high magnetostrictive material portions (alloy layer) 2b.

EXAMPLE 6B

Figure 15A:
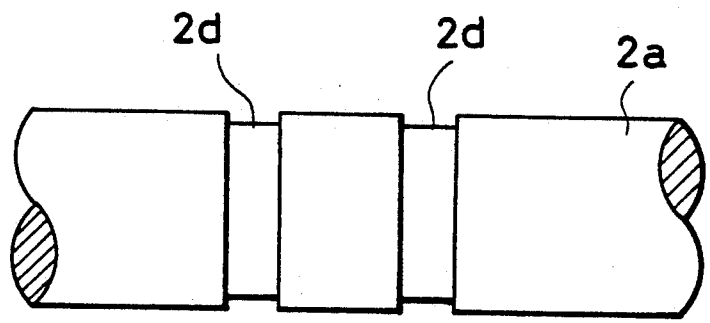
FIGS. 15(a) and 15(b) are enlarged plan views showing a modification of the sixth embodiment of the detecting apparatus according to the present invention.
Figure 15B:
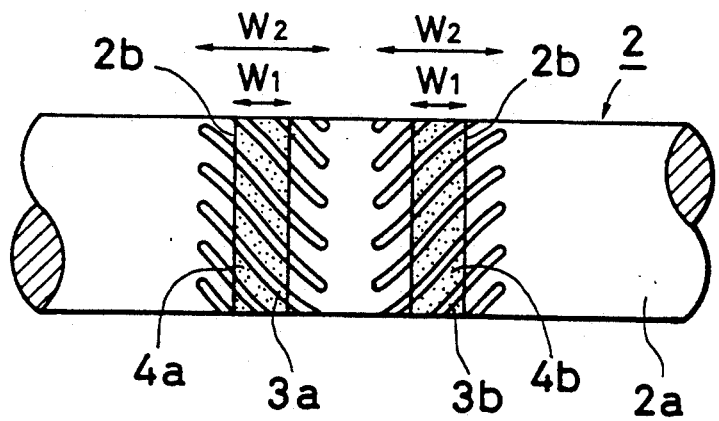
Figure 15C:
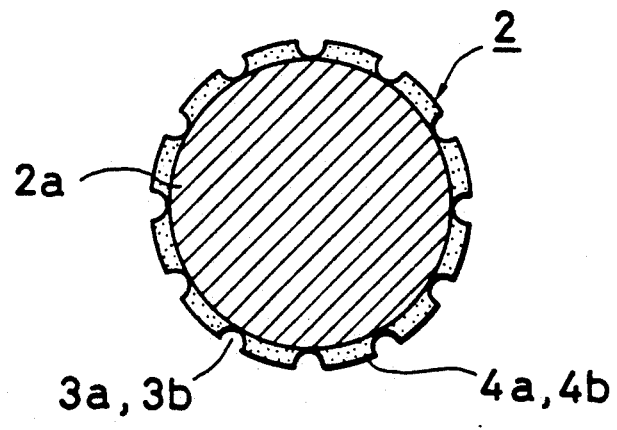
FIG. 15(c) is an enlarged plan view showing the shape anisotropic portions formed on the circumferential surface of the shaft shown in FIG. 15(a)

FIGS. 15(b) and 15(c) are enlarged view showing the shape anisotropic portions 4a and 4b formed on the outer circumferential surface of two grooves 2d formed in the shaft 2. The substrate shaft was made of a carbon steel JIS S25C. The high magnetostrictive alloy layer 2b made of Fe-Al alloy (including 13 wt. % Al and 87 wt. % Fe) was welded on the surface of the two grooves 2d metallographically by plasma powder welding. The alloy layer 2b was cut to 31 mm in diameter. Further, two symmetrically arranged groups of 32 V-shaped concave portions 3a and 3b each with a width of 1.5 mm and a depth of 1.5 mm, respectively, were formed by cutting the outer circumferential surface of the alloy layer 2b, so as to be arranged at regular angular intervals with an inclination angle with respect to the shaft axial direction, therefore, a plurality of shape anisotropic portions 4a and 4b were formed between two of these concave portions 3a and 3b, respectively. Thereafter, the shaft 2 was quenched by high frequency induction heat to increase the yield point of the substrate shaft 2a.

In this example, there exists a feature such that it is possible to freely determine the axial width W1 of the highly magnetostrictive material 2b, irrespective of the axial length W2 of the shape anisotropic portions 3b. In this case, it is preferable to determine the axial width W2 of the shape anisotropic portions to be wider than the width of the coil 5a or 5b, preferably within a range from 10 to 20 mm. On the other hand, it is possible to determine the axial width W1 of the high magnetostrictive material portion 2b to be narrower than the width of the coil 5a or 5b, without reducing the detecting sensitivity. However, it is preferable to determine the width W1 of the magnetostrictive material 2b to be a half or more of the width of the coil 5a and 5b to increase the detecting sensitivity.

Figure 15D:
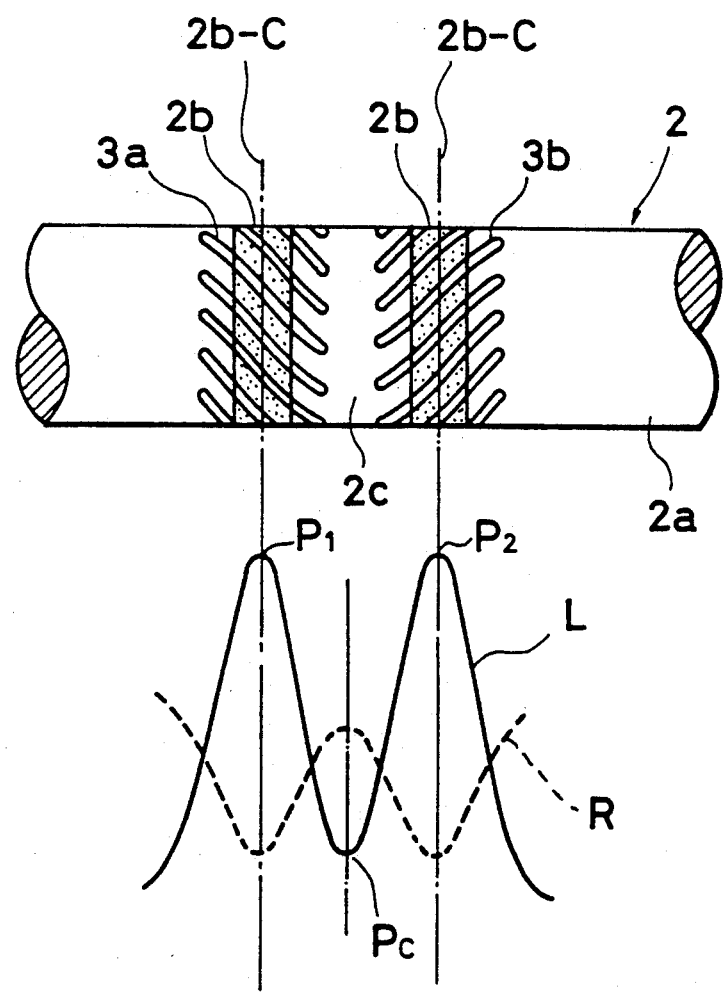
FIG. 15(d) is an illustration for assistance in explaining the coil characteristics according to coil positions relative to the shaft shown in FIG. 15(b)

In the same way as shown in FIG. 13(a), a single coil 55 was shifted in the axial direction of the shaft 2 to measure the inductance component L of the impedance of the coil 5. FIG. 15(d) shows the inductance L and the resistance R induced in the coil by a high frequency signal. In the drawing, the maximum points P1 and P2 of the inductance component L are located at the two central positions 2b-C of the two high magnetostrictive material portions 2b, respectively. This indicates that the low permeability portion 2c serves a s magnetic resistance between the two high magnetostrictive portions 2b.

In this example, the axial width W1 of the high magnetostrictive material portion 2b was 10 mm; the axial width of the low permeability portion 2c was also 10 mm, and the inductance value Pc at the center of the low permeability portion 2c was 90% of the maximum inductance value P1 or P2. Therefore, in this example, the two coils 5a and 5b can be located at the two central positions 2b-C of the two high magnetostrictive material portion 2b, respectively.

Figure 15E:
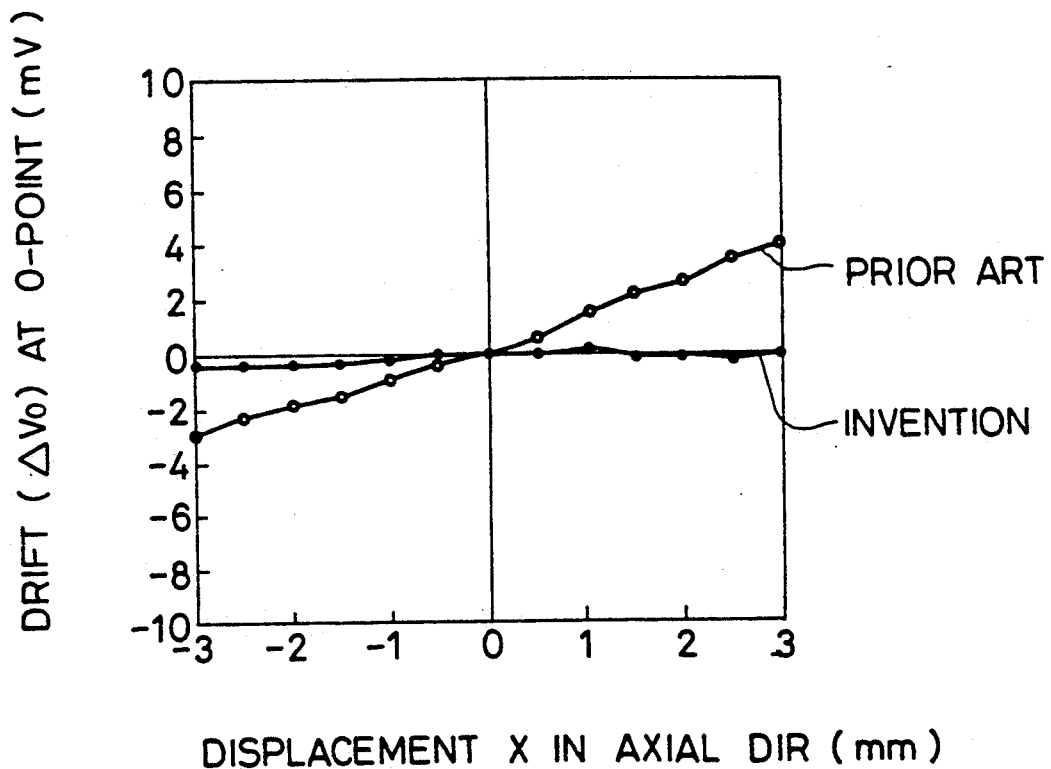
FIG. 15(e) is a graphical representation showing the relationship between the shaft displacement and the zero-point drift voltage of the detecting apparatus shown in FIG. 15(b) in comparison with the prior art apparatus.

FIG. 15(e) shows the relationship between the drift voltage (mV) at the zero-torque point and the shaft displacement X(mm) in the axial direction. This indicates that the drift voltage can be reduced markedly, as compared with the prior-art shaft and, therefore, positional adjustment of the coils is unnecessary. Further, in FIG. 15(e), each dot indicates an average value of several tens of test sample shafts 2. In these test sample shafts, the maximum inductances L thereof were all located at the central positions of the high magnetostrictive material portions (alloy layer) 2b.

Further, in this example, it is possible to freely adjust the maximum inductance position P1 and P2 within the axial width W2 of the shape anisotropic portion 4a and 4b by adjusting the axial position of the high magnetostrictive material portion 2b. Therefore, it is possible to change the positions of the coils, that is, the detection positions of the shaft 2 without changing the shapes of the shape anisotropic portions 4a and 4b.

What is claimed is:

1. A magnetostrictive torque detecting apparatus comprising:
    (a) a shaft composed of a substrate shaft portion made of a high yield point material and a torque detecting layer portion made of a high magnetostrictive material welded on an outer surface of the substrate shaft portion, the torque detecting layer portion being Fe-Al alloy formed with two symmetrically arranged groups of concave/convex portions, the concave-convex portions of each group being deformed plastically at regular angular intervals on the outer circumferential surface of the torque detecting layer portion at an inclination angle with respect to the axial direction of said shaft by surface heating said shaft between 400° and 900° C. where the Charpy impact value of the alloy layer is relatively high;
    (b) coil means for magnetically exciting the torque detecting layer portion of said shaft; and
    (c) coil means for detecting magnetostrictive components generated in the torque detecting layer portion of said shaft distorted by a torque.

2. A magnetostrictive torque detecting apparatus comprising:
    (a) a shaft composed of a substrate shaft portion made of a high yield point material and a torque detecting layer portion made of a high magnetostrictive material welded on the outer surface of the substrate shaft portion, the torque detecting layer portion being divided into two symmetrical portions with an exposed low permeability surface portion of the substrate shaft portion interposed between the two divided portions, two symmetrically arranged groups of concave/convex portions being formed on the two divided portions, respectively;
    (b) two coil means axially located at central positions of the two divided portions, respectively, for magnetically exciting the torque detecting layer portions of said shaft; and
    (c) two coil means located at the axially central positions of the two divided portions, respectively, for detecting magnetostrictive components generated in the torque detecting layer portions of said shaft distorted by a torque.

3. The apparatus of claim 1, wherein the welding is carried out metallographically.

* * * * *